US010771689B2

(12) United States Patent
Guo et al.

(10) Patent No.: US 10,771,689 B2
(45) Date of Patent: Sep. 8, 2020

(54) IMAGE PROCESSING METHOD AND DEVICE, COMPUTER-READABLE STORAGE MEDIUM AND ELECTRONIC DEVICE

(71) Applicant: GUANGDONG OPPO MOBILE TELECOMMUNICATIONS CORP., LTD., Dongguan, Guangdong (CN)

(72) Inventors: Ziqing Guo, Dongguan (CN); Haitao Zhou, Dongguan (CN); Kamwing Au, Dongguan (CN); Fangfang Hui, Dongguan (CN); Xiao Tan, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/393,778

(22) Filed: Apr. 24, 2019

(65) Prior Publication Data
US 2019/0335098 A1    Oct. 31, 2019

(30) Foreign Application Priority Data

Apr. 28, 2018   (CN) .......................... 2018 1 0404505

(51) Int. Cl.
*H04N 5/232* (2006.01)
*G06T 7/50* (2017.01)
(Continued)

(52) U.S. Cl.
CPC ..... *H04N 5/23229* (2013.01); *G06K 9/00288* (2013.01); *G06T 7/50* (2017.01); *H04N 5/33* (2013.01)

(58) Field of Classification Search
CPC .......... G06K 9/00221; G06K 9/00288; G06K 9/00906; G06T 7/50; H04N 5/23229; H04N 5/33
See application file for complete search history.

(56) References Cited

U.S. PATENT DOCUMENTS 7,652,251 B1 * 1/2010 King .................... G02B 23/12
250/332
2015/0350769 A1 * 12/2015 Sun ........................ H04N 7/142
348/14.08
(Continued)

FOREIGN PATENT DOCUMENTS

CN    105335722 A    2/2016
CN    105516613 A    4/2016
(Continued)

OTHER PUBLICATIONS

Takamasa Ando et al: "Speckle-learning-based object recognition through scattering media", Optics Express, vol. 23, No. 26, Dec. 23, 2015 (Dec. 23, 2015), p. 33902, XP055622895.
(Continued)

*Primary Examiner* — Amy R Hsu
(74) *Attorney, Agent, or Firm* — Ladas & Parry, LLP

(57) ABSTRACT

An image processing method and device, a computer-readable storage medium and an electronic device are provided. The method includes that: a target infrared image and a target depth image are acquired, and face detection is performed according to the target infrared image to determine a target face region, here, the target depth image is used to represent depth information corresponding to the target infrared image; a target face attribute parameter corresponding to the target face region is acquired, and face matching processing is performed on the target face region according to the target face attribute parameter; responsive to that face matching succeeds, liveness detection processing is per-
(Continued)

formed on the target face region according to the target depth image to obtain a liveness detection result; and a face verification result is obtained according to the liveness detection result.

18 Claims, 7 Drawing Sheets

(51) Int. Cl.
*G06K 9/00* (2006.01)
*H04N 5/33* (2006.01)

(56) References Cited

U.S. PATENT DOCUMENTS

| | | | |
|---|---|---|---|
| 2016/0117544 A1* | 4/2016 | Hoyos | H04N 5/33 348/78 |
| 2017/0344793 A1 | 11/2017 | Xue et al. | |
| 2017/0345146 A1* | 11/2017 | Fan | G06K 9/00228 |
| 2017/0367590 A1* | 12/2017 | Sebe | A61B 5/0077 |
| 2018/0211096 A1* | 7/2018 | Cao | G06T 13/40 |
| 2018/0367656 A1* | 12/2018 | Kim | G06F 21/32 |
| 2019/0034702 A1 | 1/2019 | Hong | |
| 2019/0251334 A1* | 8/2019 | Kawase | G06K 9/00255 |

FOREIGN PATENT DOCUMENTS

| | | |
|---|---|---|
| CN | 105518582 A | 4/2016 |
| CN | 205140028 U | 4/2016 |
| CN | 106407914 A | 2/2017 |
| CN | 106533667 A | 3/2017 |
| CN | 106874871 A | 6/2017 |
| CN | 107341481 A | 11/2017 |
| CN | 107451510 A | 12/2017 |
| CN | 107590430 A | 1/2018 |
| CN | 107590463 A | 1/2018 |
| CN | 107832677 A | 3/2018 |
| CN | 108764052 A | 11/2018 |
| EP | 2645302 A2 | 10/2013 |

OTHER PUBLICATIONS

International Search Report in the international application No. PCT/CN2019/070845, dated Apr. 4, 2019.
European Search Report in the European application No. 19171189.4, dated Sep. 24, 2019.
Written Opinion of the International Search Authority in international application No. PCT/CN2019/070845, dated Apr. 4, 2019.
Yu, Gou et al. "Network identity authentication system based on fingerprint identification"; Proceedings of the information confidentiality committee of the Chinese computer society; Sep. 30, 2006; p. 315.
Third Office Action and search report of the Chinese application No. 201810404505.2, dated Jan. 13, 2020.
First Office Action of the Taiwanese application No. 108114617, dated Jan. 2, 2020.
First Office Action and Search Report of the Chinese application No. 201810404505.2, dated Feb. 25, 2019.
Second Office Action of the Chinese application No. 201810404505.2, dated May 15, 2019.
Notice of Rejection of the Chinese application No. 201810404505.2, dated Jul. 29, 2019.

* cited by examiner

IMAGE PROCESSING METHOD AND DEVICE, COMPUTER-READABLE STORAGE MEDIUM AND ELECTRONIC DEVICE

CROSS-REFERENCE TO RELATED APPLICATIONS

The application claims priority and rights to Chinese Patent Application No. 201810404505.2, filed on Apr. 28, 2018, the disclosure of which is hereby incorporated by reference in its entirety.

BACKGROUND

Face recognition technologies are used in intelligent terminals more and more widely because of unique features of a face. Many application programs of an intelligent terminal may require face authentication, for example, unlocking of the intelligent terminal through the face or payment authentication through the face. The intelligent terminal may also process an image including the face, for example, recognition of facial features, creation of emoji package according to facial expressions, or retouching processing through facial features.

SUMMARY

Embodiments of the disclosure provide a method and device for image processing, a computer-readable storage medium and an electronic device.

In a first aspect, a method for image processing is provided. The method is applied to an electronic device comprising a first processor and may include the following operations.

The first processor acquires a target infrared image and a target depth image, and performs face detection according to the target infrared image to determine a target face region, here, the target depth image represents depth information corresponding to the target infrared image; the first processor acquires a target face attribute parameter corresponding to the target face region, and performs face matching processing on the target face region according to the target face attribute parameter; responsive to that face matching succeeds, performs liveness detection processing on the target face region according to the target depth image to obtain a liveness detection result; and obtains a face verification result according to the liveness detection result.

In a second aspect, a device for image processing is provided. The device may include a face detection module, a face matching module, a liveness detection module and a face verification module. The face detection module may be configured to acquire a target infrared image and a target depth image, and perform face detection according to the target infrared image to determine a target face region, here, the target depth represents depth information corresponding to the target infrared image. The face matching module may be configured to acquire a target face attribute parameter corresponding to the target face region, and perform face matching processing on the target face region according to the target face attribute parameter. The liveness detection module may be configured to, responsive to that face matching succeeds, perform liveness detection processing on the target face region according to the target depth image to obtain a liveness detection result. The face verification module may be configured to obtain a face verification result according to the liveness detection result.

In a third aspect, an electronic device is provided. The electronic device may include a memory and a first processor. The memory stores instructions that, when executed by the first processor, cause the first processor to perform the following operations.

A target infrared image and a target depth image are acquired, and face detection is performed according to the target infrared image to determine a target face region, here, the target depth image represents depth information corresponding to the target infrared image; a target face attribute parameter corresponding to the target face region is acquired, and face matching processing is performed on the target face region according to the target face attribute parameter; responsive to that face matching succeeds, liveness detection processing is performed on the target face region according to the target depth image to obtain a liveness detection result; and a face verification result is obtained according to the liveness detection result.

In a fourth aspect, a computer-readable storage medium is provided. The computer-readable storage medium has stored thereon a computer program that, when executed by one or more processors, cause the one or more processors to implement the following operations.

A target infrared image and a target depth image are acquired, and face detection is performed according to the target infrared image to determine a target face region, here, the target depth image represents depth information corresponding to the target infrared image; a target face attribute parameter corresponding to the target face region is acquired, and face matching processing is performed on the target face region according to the target face attribute parameter; responsive to that face matching succeeds, liveness detection processing is performed on the target face region according to the target depth image to obtain a liveness detection result; and a face verification result is obtained according to the liveness detection result.

BRIEF DESCRIPTION OF DRAWINGS

In order to describe the technical solutions in the embodiments of the disclosure or a related art more clearly, the drawings required to be used in descriptions about the embodiments or the related art will be simply introduced below. It is apparent that the drawings described below are only some embodiments of the disclosure. Other drawings may further be obtained by those of ordinary skill in the art according to these drawings without creative work.

DETAILED DESCRIPTION

For making purposes, technical solutions and advantages of the disclosure clearer, the disclosure will further be described below in combination with the drawings and the embodiments in detail. It to be understood that specific embodiments described herein are intended to be used only to explain the disclosure and not intended to limit the disclosure.

Terms "first", "second" and the like used in the disclosure may be used herein to describe various components but are not intended to limit these components. These terms are only adopted to distinguish a first component from another component. For example, without departing from the scope of the disclosure, a first client may be called a second client and similarly, a second client may be called a first client. Both of a first client and a second client are clients, but they are different clients.

Figure 2:
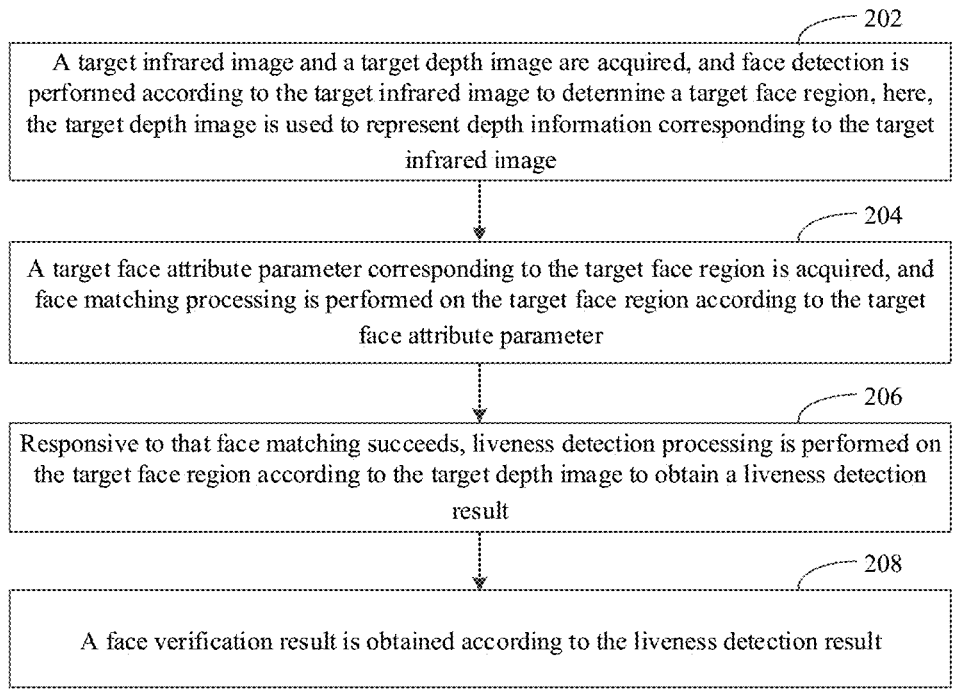
FIG. 2 is a flowchart of a method for image processing according to an embodiment of the disclosure.

Referring to FIG. 2, a method for image processing of the disclosure includes the following operations.

In 202, a target infrared image and a target depth image are acquired, and face detection is performed according to the target infrared image to determine a target face region, here, the target depth image represents depth information corresponding to the target infrared image.

In 204, a target face attribute parameter corresponding to the target face region is acquired, and face matching processing is performed on the target face region according to the target face attribute parameter.

In 206, responsive to that face matching succeeds, liveness detection processing is performed on the target face region according to the target depth image to obtain a liveness detection result.

In 208, a face verification result is obtained according to the liveness detection result.

In an embodiment, the target face attribute parameter includes at least one of: a face deflection angle, a face brightness parameter, a parameter about facial features, a skin type parameter, or a geometric feature parameter.

Figure 3:
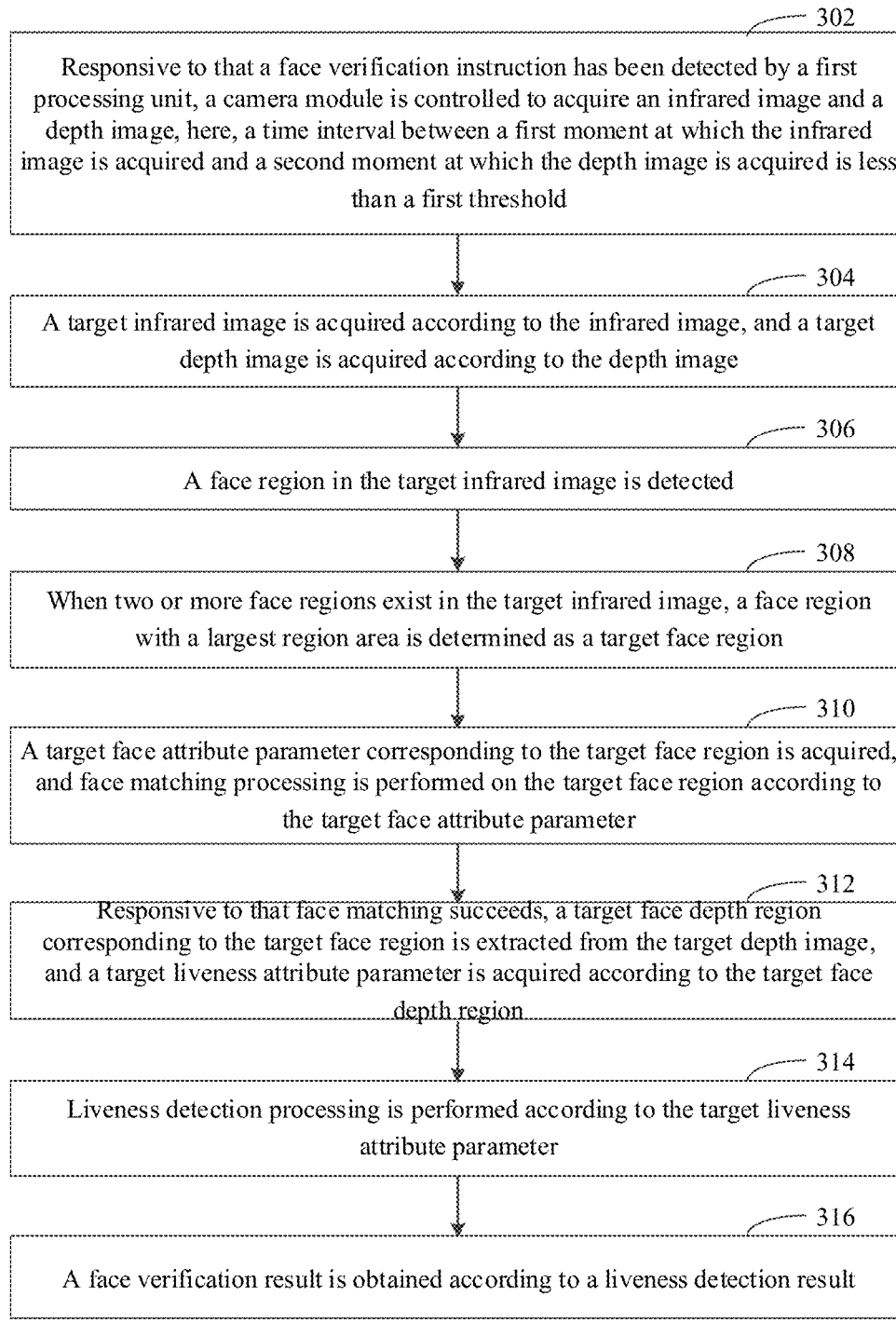
FIG. 3 is a flowchart of a method for image processing according to another embodiment of the disclosure.

Referring to FIG. 3, in an embodiment, the operation that the target infrared image and the target depth image are acquired includes the following operations.

In 302, responsive to that a face verification instruction has been detected by a first processing unit, a camera module is controlled to acquire an infrared image and a depth image. Herein, a time interval between a first moment at which the infrared image is acquired and a second moment at which the depth image is acquired is less than a first threshold.

In 304, the target infrared image is acquired according to the infrared image, and the target depth image is acquired according to the depth image.

Figure 5:
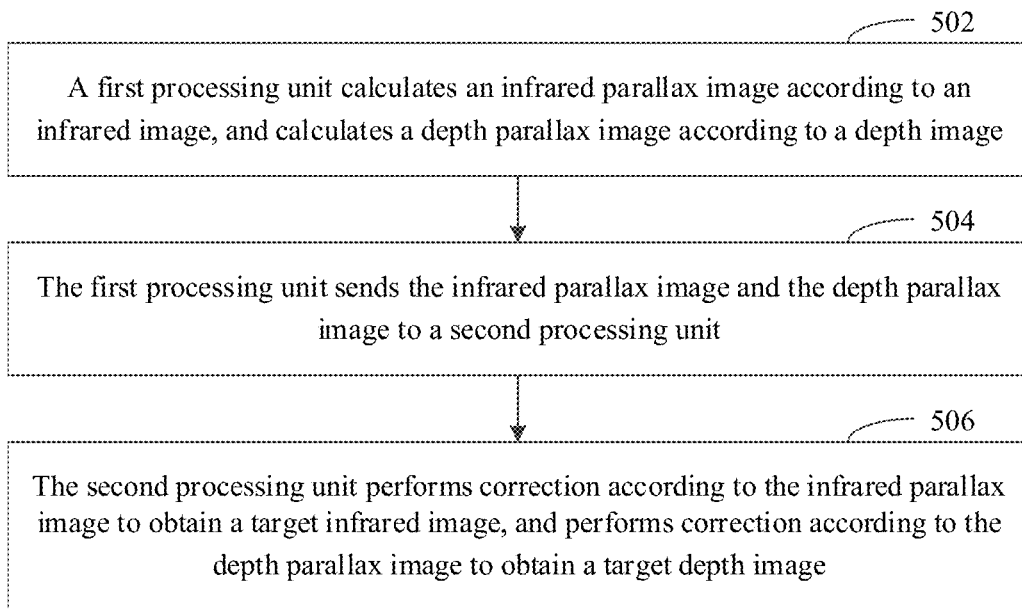
FIG. 5 is a flowchart of a method for image processing according to yet another embodiment of the disclosure.

Referring to FIG. 5, in an embodiment, the operation that the target infrared image is acquired according to the infrared image and the target depth image is acquired according to the depth image includes the following operations.

In 502, the first processing unit calculates an infrared parallax image according to the infrared image, and calculates a depth parallax image according to the depth image.

In 504, the first processing unit sends the infrared parallax image and the depth parallax image to a second processing unit.

In 506, the second processing unit performs correction according to the infrared parallax image to obtain the target infrared image, and performs correction according to the depth parallax image to obtain the target depth image.

Referring to FIG. 3, in an embodiment, the operation that face detection is performed according to the target infrared image to determine the target face region includes the following operations.

In 306, a face region in the target infrared image is detected.

In 308, when two or more face regions exist in the target infrared image, a face region with a largest region area is determined as the target face region.

Referring to FIG. 3, in an embodiment, the operation that liveness detection processing is performed on the target face region according to the target depth image includes the following operations.

In 312, a target face depth region corresponding to the target face region is extracted from the target depth image, and a target liveness attribute parameter is acquired according to the target face depth region.

In 314, the liveness detection processing is performed according to the target liveness attribute parameter.

In an embodiment, the target liveness attribute parameter includes at least one of: face depth information, a skin type feature, a texture direction, a texture density, or a texture width.

Figure 6:
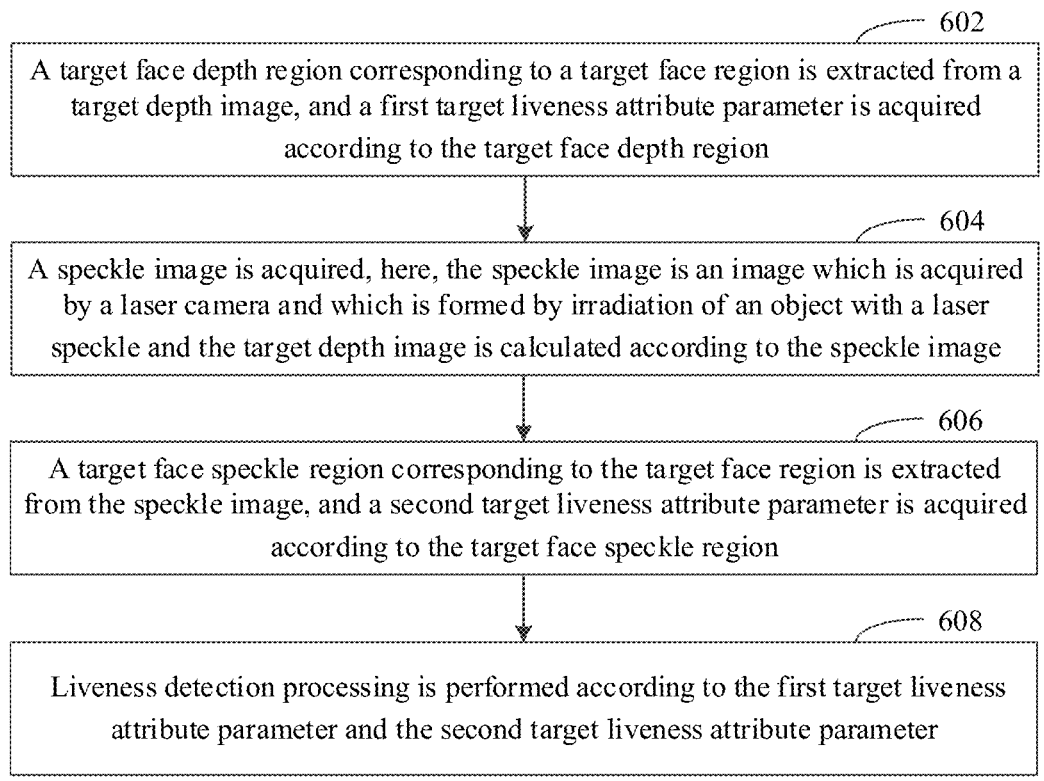
FIG. 6 is a flowchart of a method for image processing according to still another embodiment of the disclosure.

Referring to FIG. 6, in an embodiment, the operation that liveness detection processing is performed on the target face region according to the target depth image includes the following operations.

In 602, the target face depth region corresponding to the target face region is extracted from the target depth image, and a first target liveness attribute parameter is acquired according to the target face depth region.

In 604, a speckle image is acquired, here, the speckle image is an image which is acquired by a laser camera and which is formed by irradiation of an object with a laser speckle, and the target depth image is calculated according to the speckle image.

In 606, a target face speckle region corresponding to the target face region is extracted from the speckle image, and a second target liveness attribute parameter is acquired according to the target face speckle region.

In 608, the liveness detection processing is performed according to the first target liveness attribute parameter and the second target liveness attribute parameter.

In an embodiment, the operation that the face verification result is obtained according to the liveness detection result includes that: responsive to that liveness detection succeeds, a result indicating that face verification succeeds is obtained; responsive to that liveness detection fails, a result indicating that face verification fails is obtained.

The method further includes that: responsive to that face matching fails, a result indicating that face verification fails is obtained.

Figure 10:
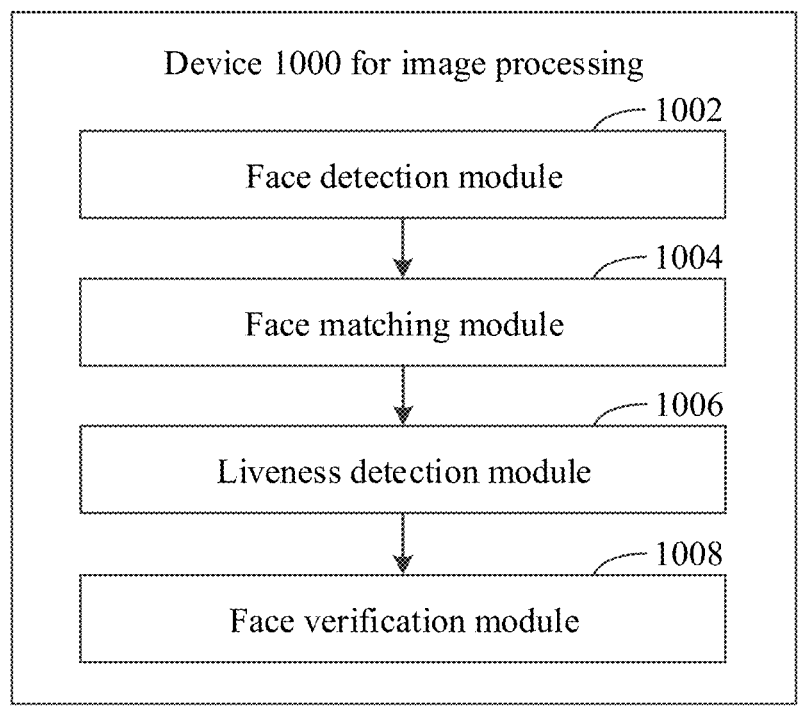
FIG. 10 is a structure diagram of a device for image processing according to an embodiment of the disclosure.

Referring to FIG. 10, a device 1000 for image processing of the disclosure includes a face detection module 1002, a face matching module 1004, a liveness detection module 1006 and a face verification module 1008.

The face detection module 1002 is configured to acquire a target infrared image and a target depth image, and perform face detection according to the target infrared image to determine a target face region, here, the target depth image represents depth information corresponding to the target infrared image.

The face matching module 1004 is configured to acquire a target face attribute parameter corresponding to the target face region, and perform face matching processing on the target face region according to the target face attribute parameter.

The liveness detection module 1006 is configured to, responsive to that face matching succeeds, perform liveness detection processing on the target face region according to the target depth image to obtain a liveness detection result.

The face verification module 1008 is configured to obtain a face verification result according to the liveness detection result.

In an embodiment, the target face attribute parameter includes at least one of: a face deflection angle, a face brightness parameter, a parameter about facial features, a skin type parameter, or a geometric feature parameter.

In an embodiment, the face detection module 1002 is further configured to, responsive to that a face verification instruction has been detected by a first processing unit, control a camera module to acquire an infrared image and a depth image, here, a time interval between a first moment at which the infrared image is acquired and a second moment at which the depth image is acquired is less than a first threshold. The face detection module 1002 is further configured to acquire the target infrared image according to the infrared image and acquire the target depth image according to the depth image.

In an embodiment, the face detection module 1002 is further configured to control the first processing unit to calculate an infrared parallax image according to the infrared image and calculate a depth parallax image according to the depth image, control the first processing unit to send the infrared parallax image and the depth parallax image to a second processing unit, and control the second processing unit to perform correction according to the infrared parallax image to obtain the target infrared image and perform correction according to the depth parallax image to obtain the target depth image.

In an embodiment, the face detection module 1002 is further configured to detect a face region in the target infrared image and, when two or more face regions exist in the target infrared image, determine a face region with a largest region area as the target face region.

In an embodiment, the liveness detection module 1006 is further configured to extract a target face depth region corresponding to the target face region from the target depth image, acquire a target liveness attribute parameter according to the target face depth region and perform liveness detection processing according to the target liveness attribute parameter.

In an embodiment, the target liveness attribute parameter includes at least one of: face depth information, a skin type feature, a texture direction, a texture density, or a texture width.

In an embodiment, the liveness detection module 1006 is further configured to extract the target face depth region corresponding to the target face region from the target depth image and acquire a first target liveness attribute parameter according to the target face depth region; acquire a speckle image, here, the speckle image is an image, which is acquired by a laser camera, formed by irradiation of an object with a laser speckle, and the target depth image is calculated according to the speckle image; extract a target face speckle region corresponding to the target face region from the speckle image and acquire a second target liveness attribute parameter according to the target face speckle region; and perform liveness detection processing according to the first target liveness attribute parameter and the second target liveness attribute parameter.

In an embodiment, the face verification module 1008 is further configured to, responsive to that liveness detection succeeds, obtain a result indicating that face verification succeeds; responsive to that liveness detection fails, obtain a result indicating that face verification fails, responsive to that face matching fails, obtain a result indicating that face verification fails.

A computer-readable storage medium of the disclosure stores a computer program that, when executed by a processor, cause the processor to perform the method for image processing of any abovementioned embodiment.

An electronic device 104 of the disclosure includes a memory and a processor.

The memory stores a computer-readable instruction that, when executed by the processor, cause the processor to perform the method for image processing of any abovementioned embodiment.

According to the method and device for image processing, computer-readable storage medium and electronic device of the abovementioned embodiments, the target infrared image and the target depth image may be acquired, and face detection may be performed according to the target infrared image to obtain the target face region. Then, the target face attribute parameter corresponding to the target face region is acquired, and face matching processing is performed on the target face region according to the target face attribute parameter. After face matching succeeds, liveness detection is performed on the target face region according to the target depth image, and the final face verification result is obtained according to the liveness detection result. In such a manner, in a face verification process, face matching may be performed according to the infrared image and liveness detection may be performed according to the depth image, so that the accuracy of the face verification is improved.

Figure 1:
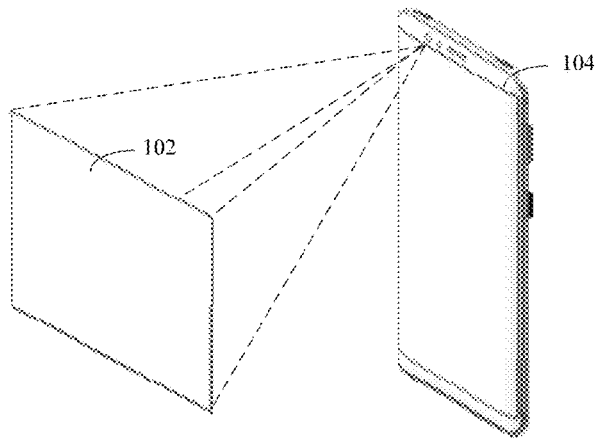
FIG. 1 is a diagram of an application scenario of a method for image processing according to an embodiment the disclosure.

FIG. 1 is a diagram of an application scenario of a method for image processing according to an embodiment. As illustrated in FIG. 1, the application scenario includes a user 102 and an electronic device 104. A camera module may be mounted in the electronic device 104. A target infrared image and target depth image corresponding to the user 102 are acquired, and face detection is performed according to the target infrared image to determine a target face region, here, the target depth image represents depth information corresponding to the target infrared image. A target face attribute parameter corresponding to the target face region is acquired, and face matching processing is performed on the target face region according to the target face attribute parameter. Responsive to that face matching succeeds, liveness detection processing is performed on the target face region according to the target depth image to obtain a liveness detection result. A face verification result is obtained according to the liveness detection result. Herein, the electronic device 104 may be a smart phone, a tablet computer, a personal digital assistant, a wearable device and the like.

FIG. 2 is a flowchart of a method for image processing according to an embodiment. As illustrated in FIG. 2, the method for image processing includes the following operations.

In 202, a target infrared image and a target depth image are acquired, and face detection is performed according to the target infrared image to determine a target face region, here, the target depth image is used to represent depth information corresponding to the target infrared image.

In an embodiment, a camera may be mounted on the electronic device, and the images are acquired through the mounted camera. Cameras may be divided into a laser camera, a visible light camera and the like according to different acquired images. The laser camera may acquire an image formed by irradiation of an object with laser, and a visible light camera may acquire an image formed by radiation of the object with visible light. A plurality of cameras may be mounted on the electronic device, and there are no limits made to mounting positions. For example, a camera may be mounted on a front panel of the electronic device, two cameras may be mounted on a back panel of the electronic device, or the cameras may also be mounted in the electronic device in an embedding manner and then the cameras are turned on in a rotating or sliding manner. Specifically, a front camera and a rear camera may be mounted on the electronic device, and the front camera and the rear camera may acquire images from different viewing angles. In general, the front camera may acquire images from a front viewing angle of the electronic device, and the rear camera may acquire images from a back viewing angle of the electronic device.

The target infrared image and target depth image acquired by the electronic device correspond to each other, and the target depth image is used to represent the depth information corresponding to the target infrared image. The target infrared image may display acquired detail information of the shot object, and the target depth image may represent the depth information of the shot image. After the target infrared image is acquired, face detection may be performed according to the target infrared image, thereby detecting whether the target infrared image includes a face. When the target infrared image includes the face, the target face region where the face in the target infrared image is located is extracted. Since the target infrared image and the target depth image correspond to each other, after the target face region is extracted, depth information corresponding to each pixel in the target face region may be acquired according to a corresponding region in the target depth image.

In 204, a target face attribute parameter corresponding to the target face region is acquired, and face matching processing is performed on the target face region according to the target face attribute parameter.

The target face attribute parameter refers to a parameter capable of representing an attribute of a target face. Recognition and matching processing may be performed on the target face according to the target face attribute parameter. The target face attribute parameter may include, but not limited to, a face deflection angle, a face brightness parameter, a parameter about the five sense organs, a skin type parameter, a geometric feature parameter and the like. The electronic device may pre-store a preset face region for matching and then acquire a face attribute parameter of the preset face region. After the target face attribute parameter is acquired, the target face attribute parameter may be compared with a pre-stored face attribute parameter. When the target face attribute parameter matches the pre-stored face attribute parameter, the preset face region corresponding to the matched face attribute parameter is a preset face region corresponding to the target face region.

The preset face region stored in the electronic device is considered as a face region with an operation right. When the target face region matches the preset face region, it is determined that a user corresponding to the target face region has the operation right. That is, when the target face region matches the preset face region, it is determined that face matching succeeds; and when the target face region does not match the preset face region, it is determined that face matching fails.

In 206, responsive to that face matching succeeds, liveness detection processing is performed on the target face region according to the target depth image to obtain a liveness detection result.

The target infrared image and the target depth image correspond to each other. After the target face region is extracted according to the target infrared image, a region where the target face is located in the target depth image may be found according to a position of the target face region. Specifically, an image is a two-dimensional pixel matrix and a position of each pixel in the image may be represented by a two-dimensional coordinate. For example, a coordinate system is created by taking the pixel at a leftmost lower corner of the image as a coordinate origin, rightward movement by a pixel on the basis of the coordinate origin refers to movement towards a positive direction of an axis X by a unit and upward movement by a pixel refers to movement towards a positive direction of an axis Y by a unit. Therefore, the position of each pixel in the image may be represented by a two-dimensional coordinate.

After the target face region is detected in the target infrared image, a position of any pixel in the target face region in the target infrared image may be represented by a face coordinate, and then a position of the target face in the target depth image is determined according to the face coordinate, thereby acquiring face depth information corresponding to the target face region. In general, a live face is three-dimensional, while a face displayed in, for example, a picture and a screen, is plane. In addition, for different skin types, acquired depth information may also be different. Therefore, whether the acquired target face region is three-dimensional or plane may be determined according to the acquired face depth information, and a skin type feature of the face may also be obtained according to the acquired face depth information so as to perform liveness detection on the target face region.

In 208, a face verification result is obtained according to the liveness detection result.

In an embodiment, face matching processing is performed according to the target infrared image, and responsive to that face matching succeeds, liveness detection is performed according to the target depth image. Only after both of face matching and liveness detection succeed, it is determined that face verification succeeds. A processing unit of the electronic device may receive a face verification instruction initiated by an upper-layer application program. The processing unit, after detecting the face verification instruction, performs face verification processing according to the target infrared image and the target depth image, and finally returns the face verification result to the upper-layer application program. The application program performs subsequent processing according to the face verification result.

According to the method for image processing provided in the embodiment, the target infrared image and the target depth image may be acquired, and face detection may be performed according to the target infrared image to obtain the target face region. Then, the target face attribute parameter corresponding to the target face region is acquired, and face matching processing is performed on the target face region according to the target face attribute parameter. After face matching succeeds, liveness detection is performed on the target face region according to the target depth image, and the final face verification result is obtained according to the liveness detection result. In such a manner, in a face verification process, face matching may be performed according to the infrared image and liveness detection may be performed according to the depth image, so that the accuracy of the face verification is improved.

FIG. 3 is a flowchart of a method for image processing according to another embodiment. As illustrated in FIG. 3, the method for image processing includes the following operations.

In 302, responsive to that that a face verification instruction has been detected by a first processing unit, a camera module is controlled to acquire an infrared image and a depth image, here, a time interval between a first moment at which the infrared image is acquired and a second moment at which the depth image is acquired is less than a first threshold.

In an embodiment, a processing unit of an electronic device may receive an instruction from an upper-layer application program. The processing unit, responsive to that that the face verification instruction has been received, may control the camera module to operate so as to acquire the infrared image and the depth image through a camera. The processing unit is connected to the camera, the images acquired by the camera may be transmitted to the processing unit, and processing such as clipping, brightness regulation, face detection, face recognition and the like may be performed through the processing unit. The camera module may include, but not limited to, a laser camera, a laser light and a floodlight. Responsive to that that the processing unit receives the face verification instruction, the infrared image and the depth image may be directly acquired, or the infrared image and a speckle image may also be acquired and then the depth image is calculated according to the speckle image. Specifically, the processing unit may control the laser light and the floodlight to work in a time division manner; when the laser light is turned on, the speckle image is acquired through the laser camera; and when the floodlight is turned on, the infrared image is acquired through the laser camera.

It can be understood that when laser is irradiated on optical rough surfaces of which average roughness is greater than an order of magnitude of wavelength, wavelets scattered by surface elements irregularly distributed on these surfaces are mutually superposed to endow a reflected light field with a random spatial light intensity distribution and present a granular structure to form a laser speckle. The laser speckle is highly randomly formed, and thus laser speckles formed by lasers emitted by different laser emitters are different. When the formed laser speckle is irradiated on objects of different depths and shapes, different speckle images are generated. The laser speckles formed by different laser emitters are unique, so that obtained speckle images are also unique. A laser speckle formed by the laser light may be irradiated onto an object, and then the speckle image formed by irradiation of the object with the laser speckle is acquired through the laser camera.

The laser light may emit a plurality of laser speckle points, and when the laser speckle points are irradiated onto objects at different distances, speckle points are presented at different positions in images. The electronic device may acquire a standard reference image in advance, and the reference image is an image formed by irradiation of a plane with a laser speckle. Speckle points in the reference image are uniformly distributed in general. Then, correspondences between each speckle point in the reference image and a reference depth are established. When a speckle image is required to be acquired, the laser light is controlled to emit a laser speckle, and after the laser speckle is irradiated onto the object, the formed speckle image is acquired through the laser camera. Then each speckle point in the speckle image is compared with the speckle points in the reference image to acquire a position offset of the speckle point in the speckle image relative to the corresponding speckle point in the reference image, and practical depth information corresponding to the speckle point is acquired according to the position offset of the speckle point and the reference depth.

The infrared image acquired by the camera corresponds to the speckle image acquired by the camera. The speckle image may be configured to calculate the depth information corresponding to each pixel in the infrared image. In such a manner, a face may be detected and recognized through the infrared image, and depth information corresponding to the face may be calculated according to the speckle image. Specifically, in a process of calculating the depth information according to the speckle image, a relative depth is calculated at first according to a position offset of a speckle point in the speckle image relative to a corresponding speckle point in the reference image. The relative depth may represent depth information from the practically shot object to a reference plane. Then, the practical depth information of the object is calculated according to the acquired relative depth and the reference depth. The depth image is configured to represent depth information corresponding to the infrared image, which may be the relative depth from the object to the reference plane and may also be an absolute depth from the object to the camera.

The operation that the depth image is calculated according to the speckle image may specifically include that: a reference image is acquired, here, the reference image is an image, which is obtained by calibration, with reference depth information; the reference image is compared with the speckle image to obtain offset information, here, the offset information is used to represent a horizontal offset of a speckle point in the speckle image relative to a corresponding speckle point in the reference image; and the depth image is calculated according to the offset information and the reference depth information.

Figure 4:
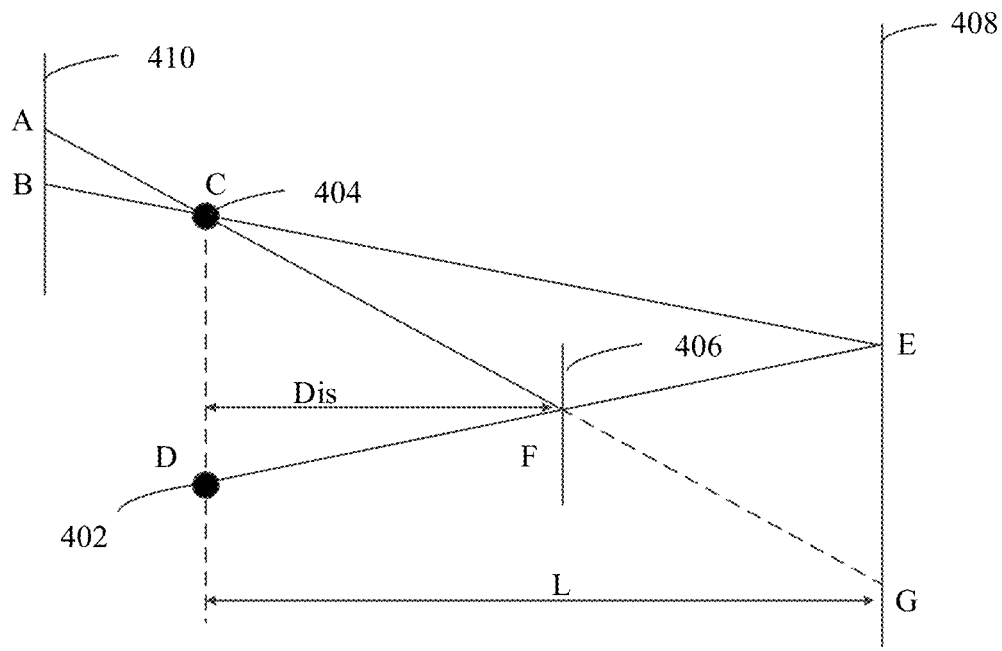
FIG. 4 is a schematic diagram of calculating depth information according to an embodiment of the disclosure.

FIG. 4 is a schematic diagram of calculating depth information according to an embodiment. As illustrated in FIG. 4, the laser light 402 may generate a laser speckle, and the image formed after the laser speckle is reflected by the object is acquired through the laser camera 404. In a calibration process of the camera, the laser speckle emitted by the laser light 402 may be reflected by the reference plane 408, then reflected light is acquired through the laser camera 404, and imaging is performed through an imaging plane 410 to obtain the reference image. The reference depth from the reference plane 408 to the laser light 402 is L, and the reference depth is known. In a practical depth information calculation process, the laser speckle emitted by the laser light 402 may be reflected by the object 406, then reflected light is acquired through the laser camera 404, and imaging is performed through the imaging plane 410 to obtain the practical speckle image. Then, a calculation formula for the practical depth information may be obtained as follows:

$$Dis = \frac{CD \times L \times f}{L \times AB + CD \times f}, \qquad \text{Formula (1)}$$

where L is a distance between the laser light 402 and the reference plane 408, f is a focal length of a lens in the laser camera 404, CD is a distance between the laser light 402 and the laser camera 404, and AB is an offset distance between imaging of the object 406 and imaging of the reference plane 408. AB may be a product of a pixel offset n and a practical distance p between pixels. When a distance Dis between the object 406 and the laser light 402 is greater than the distance L between the reference plane 408 and the laser light 402, AB is a negative value; and when the distance Dis between the object 406 and the laser light 402 is less than the distance L between the reference plane 408 and the laser light 402, AB is a positive value.

Specifically, each pixel (x, y) in the speckle image is traversed, and a pixel block, which is centered about the pixel, with a preset size is selected. For example, a pixel block with a size of 31 pixels*31 pixels may be selected. Then, the reference image is searched for a matched pixel block, a horizontal offset of a coordinate of a matched pixel in the reference image and a coordinate of the pixel (x, y) is calculated, rightward offset is positive and leftward offset is negative. The calculated horizontal offset is substituted into the formula (1) to obtain depth information of the pixel (x, y). In such a manner, depth information of each pixel in the speckle image may be sequentially calculated to obtain depth information corresponding to each pixel in the speckle image.

The depth image may be configured to represent the depth information corresponding to the infrared image, and each pixel in the depth image represents a piece of depth information. Specifically, each speckle point in the reference image corresponds to a piece of reference depth information. After a horizontal offset between the speckle point in the reference image and the corresponding speckle point in the speckle image is acquired, the relative depth information of the object in the speckle image relative to the reference plane may be calculated according to the horizontal offset, and then the practical depth information of the object relative to the camera may be calculated according to the relative depth information and the reference depth information, that is, the final depth image is obtained.

In 304, a target infrared image is acquired according to the infrared image, and a target depth image is acquired according to the depth image.

In the embodiment provided in the disclosure, after the infrared image and the speckle image are acquired, the depth image may be calculated according to the speckle image. The infrared image and the depth image may further be corrected respectively. Correcting the infrared image and the depth image respectively refers to correcting internal and external parameters in the infrared image and the depth image. For example, if the laser camera generates a deflection, the acquired infrared image and depth image are required to be corrected for errors caused by such a deflection parallax, thereby obtaining a standard infrared image and depth image. The infrared image may be corrected to obtain the target infrared image, and the depth image may be corrected to obtain the target depth image. Specifically, an infrared parallax image may be calculated according to the infrared image, and internal and external parameter correction is performed according to the infrared parallax image to obtain the target infrared image. A depth parallax image is calculated according to the depth image, and internal and external parameter correction is performed according to the depth parallax image to obtain the target depth image.

In 306, a face region in the target infrared image is detected.

In 308, when two or more face regions exist in the target infrared image, a face region with a largest region area is determined as a target face region.

It can be understood that in the target infrared image, no face region may exist, only one face region may exist, or two or more face regions may exist. When no face region exists in the target infrared image, face verification processing may not be performed. When only one face region exists in the target infrared image, face verification processing may directly be performed on the face region. When two or more face regions exist in the target infrared image, a face region may be acquired as the target face region for face verification processing. Specifically, if two or more face regions exist in the target infrared image, a region area corresponding to each face region may be calculated. The region area may be represented by the number of pixels in the face region, and a face region with the largest region area may be determined as the target face region for verification.

In 310, a target face attribute parameter corresponding to the target face region is acquired, and face matching processing is performed on the target face region according to the target face attribute parameter.

In an embodiment, a face verification process includes a face matching stage and a liveness detection stage. The face matching stage refers to a face identity recognition process, and the liveness detection stage refers to a process of detecting whether a shot face is live. In the face matching stage, a second processing unit may match the extracted target face region with a preset face region. When a target face image is matched, the target face attribute parameter of the target face image may be extracted, then the extracted target face attribute parameter is matched with a face attribute parameter, which is stored in the electronic device, of the preset face image, and if a matching value exceeds a matching threshold, it is determined that face matching succeeds. For example, a feature, such as a deflection angle, brightness information and a feature of the five sense organs, of a face in the face image may be extracted as the face attribute parameter, and if a matching degree of the extracted target face attribute parameter and the stored face attribute parameter exceeds 90%, it is determined that face matching succeeds. Specifically, it is determined whether the target face attribute parameter of the target face region matches the face attribute parameter of the preset face region; if YES, face matching of the target face region succeeds; and if NO, face matching of the target face region fails.

In 312, responsive to that face matching succeeds, a target face depth region corresponding to the target face region is extracted from the target depth image, and a target liveness attribute parameter is acquired according to the target face depth region.

In general, in a face matching processing process, whether the face region matches the preset face region may be authenticated according to the acquired target infrared image. If a face such as a picture and a sculpture is shot, matching may also succeed. Therefore, liveness detection processing is required to be performed according to the acquired target depth image, and then verification may succeed only when it is ensured that a live face is acquired. It can be understood that the acquired target infrared image may represent detail information of the face, the acquired target depth image may represent the depth information corresponding to the target infrared image and liveness detection processing may be performed according to the target depth image. For example, if the shot face is a face in a photo, it may be determined according to the target depth image that the acquired face is not three-dimensional, and then it may be determined that the acquired face is not a live face.

In 314, liveness detection processing is performed according to the target liveness attribute parameter.

Specifically, the operation that liveness detection is performed according to the target depth image includes that: the target depth image is searched for the target face depth region corresponding to the target face region, the target liveness attribute parameter is extracted according to the target face depth region, and liveness detection processing is performed according to the target liveness attribute parameter. Optionally, the target liveness attribute parameter may include face depth information, a skin type feature, a texture direction, a texture density, a texture width and the like, which correspond to the face. For example, the target liveness attribute parameter may include face depth information, and if the face depth information is consistent with a face liveness rule, it is determined that the target face region is biologically live, that is, the target face region is a live face region.

In 316, a face verification result is obtained according to a liveness detection result.

In the embodiment provided in the disclosure, after face matching processing is performed on the face and if face matching succeeds, liveness detection is performed on the face. Only when face matching succeeds and liveness detection succeeds, it is determined that face verification succeeds. Specifically, the operation 316 may include that: responsive to that liveness detection succeeds, a result indicating that face verification succeeds is obtained; and responsive to that liveness detection fails, a result indicating that face verification fails is obtained. The method for image processing may further include that: responsive to that face matching fails, a result indicating that face verification fails is obtained. The processing unit, after obtaining the face verification result, may send the face verification result to an upper-layer application program, and the application program may perform corresponding processing according to the face verification result.

For example, during payment verification according to the face, after the processing unit sends the face verification result to the application program, the application program may perform payment processing according to the face verification result. If face verification succeeds, the application program may continue a payment operation and display to a user information indicating that payment succeeds; and if face verification fails, the application program stops the payment operation and displays to the user information indicating that payment fails.

In an embodiment, the operation that the target infrared image and the target depth image are acquired may include the following operations.

In 502, the first processing unit calculates an infrared parallax image according to the infrared image and calculates a depth parallax image according to the depth image.

Specifically, the electronic device may include the first processing unit and a second processing unit, and both of the first processing unit and the second processing unit run in a secure execution environment. The secure execution environment may include a first secure environment and a second secure environment. The first processing unit runs in the first secure environment, and the second processing unit runs in the second secure environment. The first processing unit and the second processing unit are processing units distributed in different processors, and are located in different secure environments. For example, the first processing unit may be an external Microcontroller Unit (MCU) module or a secure processing module in a Digital Signal Processor (DSP), and the second processing unit may be a Central Processing Unit (CPU) core in a Trusted Execution Environment (TEE).

A CPU in the electronic device has two running modes: the TEE and a Rich Execution Environment (REE). Under a normal condition, the CPU runs in the REE. However, when the electronic device is required to acquire data with a relatively high security level, for example, when the electronic device is required to acquire face data for recognition and verification, the CPU may be switched from the REE to the TEE for running. When the CPU in the electronic device includes a single core, the single core may directly be switched from the REE to the TEE; and when the CPU in the electronic device includes multiple cores, one core of the electronic device is switched from the REE to the TEE, and the other cores keeps running in the REE.

In 504, the first processing unit sends the infrared parallax image and the depth parallax image to a second processing unit.

Specifically, the first processing unit is connected with two data transmission channels including a secure transmission channel and an insecure transmission channel. During face verification processing, processing is usually required to be performed in the secure execution environment, and the second processing unit is a processing unit in the secure execution environment, so that when the first processing unit is connected to the second processing unit, it is indicated that the first processing unit is presently connected with the secure transmission channel. When the first processing unit is connected to a processing unit in an insecure execution environment, it is indicated that the first processing unit is presently connected with the insecure transmission channel. The first processing unit, responsive to detection of the face verification instruction, may be switched to the secure transmission channel for data transmission. Then, the operation 504 may include that: it is determined whether the first processing unit is connected to the second processing unit, and if YES, the infrared parallax image and the depth parallax image are sent to the second processing unit; and if NO, the first processing unit is controlled to be connected to the second processing unit, and the infrared parallax image and the depth parallax image are sent to the second processing unit through the first processing unit.

In 506, the second processing unit performs correction according to the infrared parallax image to obtain the target infrared image, and performs correction according to the depth parallax image to obtain the target depth image.

In an embodiment, the operation that liveness detection is performed may include the following operations.

In 602, the target face depth region corresponding to the target face region is extracted from the target depth image, and a first target liveness attribute parameter is acquired according to the target face depth region.

In an embodiment, liveness detection may be performed according to the target depth image, and liveness detection may also be performed according to the target depth image and the speckle image. Specifically, the first target liveness attribute parameter is acquired according to the target depth image, a second target liveness attribute parameter is acquired according to the speckle image, and then liveness detection is performed according to the first target liveness attribute parameter and the second target liveness attribute parameter.

In 604, a speckle image is acquired, here, the speckle image is an image which is acquired by a laser camera and which is formed by irradiation of an object with a laser speckle and the target depth image is calculated according to the speckle image.

In 606, a target face speckle region corresponding to the target face region is extracted from the speckle image, and a second target liveness attribute parameter is acquired according to the target face speckle region.

The speckle image and the infrared image correspond to each other, so that the target face speckle region may be found in the speckle image according to the target face region, and then the second target liveness attribute parameter may be acquired according to the target face speckle region. The electronic device may control the laser light to be turned on and acquire the speckle image through the laser camera. Generally, the electronic device may be provided with two or more cameras, and if more than two cameras are mounted, fields of view for acquisition of each camera may be different. For ensuring that different cameras acquire images corresponding to the same scenario, it is necessary to align the images acquired by different cameras to ensure correspondences between the images acquired by the cameras. Therefore, after the camera acquires an original speckle image, the original speckle image may usually be corrected to obtain a corrected speckle image. The speckle image for liveness detection may be the original speckle image and may also be the corrected speckle image.

Specifically, if the acquired speckle image is the original speckle image acquired by the camera, before the operation 606, the method may further include that: a speckle parallax image is calculated according to the speckle image, and correction is performed according to the speckle parallax image to obtain a target speckle image. Then, the operation 606 may include that: the target face speckle region corresponding to the target face region is extracted from the target speckle image, and the second target liveness attribute parameter is acquired according to the target face speckle region.

In 608, liveness detection processing is performed according to the first target liveness attribute parameter and the second target liveness attribute parameter.

It can be understood that both of the first target liveness attribute parameter and the second target liveness attribute parameter may be obtained according to a network learning algorithm, and after the first target liveness attribute parameter and the second target liveness attribute parameter are obtained, liveness detection processing may be performed according to the first target liveness attribute parameter and the second target liveness attribute parameter. For example, the first target liveness attribute parameter may be the face depth information, the second target liveness attribute parameter may be a skin type feature parameter, the speckle image may be trained through the network learning algorithm so as to obtain the skin type feature parameter corresponding to the acquired speckle image, and then it is determined whether the face is live according to the face depth information and the skin type feature parameter.

In the embodiment provided in the disclosure, face verification processing may be performed in the second processing unit, and the second processing unit, after obtaining the face verification result, may send the face verification result to the target application program initiating the face verification instruction. Specifically, encryption processing may be performed on the face verification result, and the face verification result which has been subjected to encryption processing is sent to the target application program initiating the face verification instruction. There are no limits made to a specific encryption algorithm for performing encryption processing on the face verification result. For example, a Data Encryption Standard (DES), a Message-Digest Algorithm 5 (MD5) and Diffie-Hellman (HAVAL) may be adopted.

Specifically, encryption processing may be performed according to a network environment of the electronic device: a network security level of the network environment where the electronic device is presently located is acquired; and an encryption level is acquired according to the network security level, and encryption processing corresponding to the encryption level is performed on the face verification result. It can be understood that when the application program acquires the images for operation, a networking operation is usually required. For example, when payment authentication is performed on the face, the face verification result may be sent to the application program, and then the application program sends the face verification result to a corresponding server to complete a corresponding payment operation. The application program, when sending the face verification result, is required to be connected to a network, and then sends the face verification result to the corresponding server through the network. Therefore, when the face verification result is sent, the face verification result may be encrypted at first. The network security level of the network environment where the electronic device is presently located is detected, and encryption processing is performed according to the network security level.

If the network security level is lower, it is determined that security of the network environment is lower and the corresponding encryption level is higher. The electronic device pre-establishes correspondences between network security levels and encryption levels, and may acquire the corresponding encryption level according to the network security level and perform encryption processing on the face verification result according to the encryption level. Encryption processing may be performed on the face verification result according to the acquired reference image.

In an embodiment, the reference image is a speckle image acquired when the electronic device calibrates the camera module. Since the reference image has a high degree of uniqueness, different electronic devices acquire different reference images. Therefore, the reference image may be taken as an encryption key, and is configured to perform encryption processing on data. The electronic device may store the reference image in a secure environment so as to prevent data leakage. Specifically, the acquired reference image consists of a two-dimensional pixel matrix, and each pixel has a corresponding pixel value. Encryption processing may be performed on the face verification result according to all or part of pixels in the reference image. For example, the face verification result may include the depth image, and the reference image may directly be superposed with the depth image to obtain an encrypted image. Multiplication may also be performed on a pixel matrix corresponding to the depth image and a pixel matrix corresponding to the reference image to obtain the encrypted image. Pixel value(s) corresponding to one or more pixels in the reference image may also be taken as the encryption key to perform encryption processing on the depth image, and there are no limits made to the specific encryption algorithm in the embodiment.

The reference image is generated during calibration of the electronic device. The electronic device may pre-store the reference image in the secure environment and, when it is required to encrypt the face verification result, may read the reference image in the secure environment and perform encryption processing on the face verification result according to the reference image. In addition, the same reference image may be stored in the server corresponding to the target application program, and after the electronic device sends the face verification result which has been subjected to encryption processing to the server corresponding to the target application program, the server corresponding to the target application program acquires the reference image and performs decryption processing on the encrypted face verification result according to the acquired reference image.

It can be understood that multiple reference images acquired by different electronic devices may be stored in the server corresponding to the target application program and each electronic device corresponds to a different reference image. Therefore, the server may define a reference image identifier for each reference image, store a device identifier of the electronic device and establish correspondences between reference image identifiers and device identifiers. When the server receives the face verification result, the received face verification result may also contain the device identifier of the electronic device. The server may search for the corresponding reference image identifier according to the device identifier, find the corresponding reference image according to the reference image identifier and then perform decryption processing on the face verification result according to the found reference image.

In another embodiment provided in the disclosure, a method for performing encryption processing according to the reference image may specifically include that: a pixel matrix corresponding to the reference image is acquired, and an encryption key is acquired according to the pixel matrix; and encryption processing is performed on the face verification result according to the encryption key. The reference image consists of a two-dimensional pixel matrix. Since the acquired reference image is unique, the pixel matrix corresponding to the reference image is also unique. The pixel matrix may be taken as an encryption key to encrypt the face verification result. Certain transformation may also be performed on the pixel matrix to obtain an encryption key and then encryption processing is performed on the face verification result through the encryption key obtained by transformation. For example, the pixel matrix is a two-dimensional matrix consisting of multiple pixel values, and a position of each pixel value in the pixel matrix may be represented by a two-dimensional coordinate. Corresponding pixel values may be acquired through one or more position coordinates and the acquired one or more pixel values are combined into an encryption key. After the encryption key is acquired, encryption processing may be performed on the face verification result according to the encryption key. There are no limits made to the specific encryption algorithm in the embodiment. For example, superposition or multiplication may be directly performed on the encryption key and the data, or the encryption key as a numerical value is inserted into the data to obtain final encrypted data.

The electronic device may also adopt different encryption algorithms for different application programs. Specifically, the electronic device may pre-establish correspondences between application identifiers of application programs and encryption algorithms, and the face verification instruction may include a target application identifier of the target application program. After the face verification instruction is received, the target application identifier in the face verification instruction may be acquired, a corresponding encryption algorithm is acquired according to the target application identifier, and encryption processing is performed on the face verification result according to the acquired encryption algorithm.

Specifically, the method for image processing may further include that: one or more of the target infrared image, the target speckle image and the target depth image are acquired as images to be sent; an application level of the target application program initiating the face verification instruction is acquired, and a corresponding accuracy level is acquired according to the application level; and accuracy of the images to be sent is regulated according to the accuracy level, and the regulated images to be sent are sent to the target application program. The application level may represent an importance level corresponding to the target application program. Generally, if the application level of the target application program is higher, the accuracy of the sent image is higher. The electronic device may preset application levels of application programs and establish correspondences between application levels and accuracy levels, and may acquire a corresponding accuracy level according to an application level. For example, the application programs may be divided into four application levels such as system security type application programs, system insecurity type application programs, third-party security type application program and third-party insecurity type application programs, and accuracy levels corresponding to the four application levels gradually decrease.

The accuracy of the image to be sent may be represented as a resolution of the image or the number of speckle points in the speckle image, so that accuracy of the target depth image and target speckle image obtained according to the speckle image is also different. Specifically, the operation that the accuracy of the image is regulated may include that: the resolution of the image to be sent is regulated according to the accuracy level; or the number of the speckle points in the acquired speckle image is regulated according to the accuracy level. Herein, the number of the speckle points in the speckle image may be regulated in a software manner, and may also be regulated in a hardware manner. During regulation in the software manner, the speckle points in the acquired speckle image may be directly detected, and part of speckle points are merged or eliminated. Thus the number of the speckle points in the regulated speckle image is reduced. During regulation in the hardware manner, the number of the laser speckle points generated by diffraction of the laser light may be regulated. For example, when the accuracy is high, the number of the generated laser speckle number is 30,000; and when the accuracy is relatively low, the number of the generated laser speckle points is 20,000. Thus the accuracy of the corresponding calculated depth image may be correspondingly reduced.

Specifically, different Diffractive Optical Elements (DOEs) may be arranged in the laser light in advance. Herein, different numbers of speckle points are formed by diffraction of different DOEs. Different DOEs are switched to perform diffraction according to the accuracy level to generate the speckle image, and depth images with different accuracy are obtained according to the obtained speckle image. When the application level of the application program is relatively high, the corresponding accuracy level is also relatively high, and the laser light may control the DOE capable of generating a relatively large number of speckle points to emit the laser speckle, thereby acquiring a speckle image with a relatively large number of speckle points. When the application level of the application program is relatively low, the corresponding accuracy level is also relatively low, and the laser light may control the DOE capable of generating a relatively small number of speckle points to emit the laser speckle, thereby acquiring a speckle image with a relatively small number of speckle points.

According to the method for image processing provided in the embodiment, the first processing unit, responsive to that the face verification instruction has been detected, may control the camera module to acquire the infrared image and the depth image, then obtain the target infrared image and the target depth image according to the infrared image and the depth image and perform face detection according to the target infrared image to obtain the target face region. Then, the target face attribute parameter corresponding to the target face region is acquired, and face matching processing is performed on the target face region according to the target face attribute parameter. After face matching succeeds, liveness detection is performed according to the target depth image, and the final face verification result is obtained according to the liveness detection result. In such a manner, in a face verification process, face matching may be performed according to the infrared image and liveness detection may be performed according to the depth image, so that accuracy of the face verification is improved.

It is to be understood that although each operation in the flowcharts of FIG. 2, FIG. 3, FIG. 5 and FIG. 6 is sequentially presented according to indications of arrowheads, these operations are not always executed according to sequences indicated by the arrowheads. Unless otherwise clearly described in the invention, there are no strict limits made to execution sequences of these operations and these operations may be executed in other sequences. Moreover, at least part of operations in FIG. 2, FIG. 3, FIG. 5 and FIG. 6 may include multiple sub-operations or multiple stages, these sub-operations or stages are not always executed and completed at the same time but may be executed at different times, and these sub-operations or stages are not always sequentially executed but may be executed in turn or alternately with at least part of other operations or sub-operations or stages of the other operations.

Figure 7:
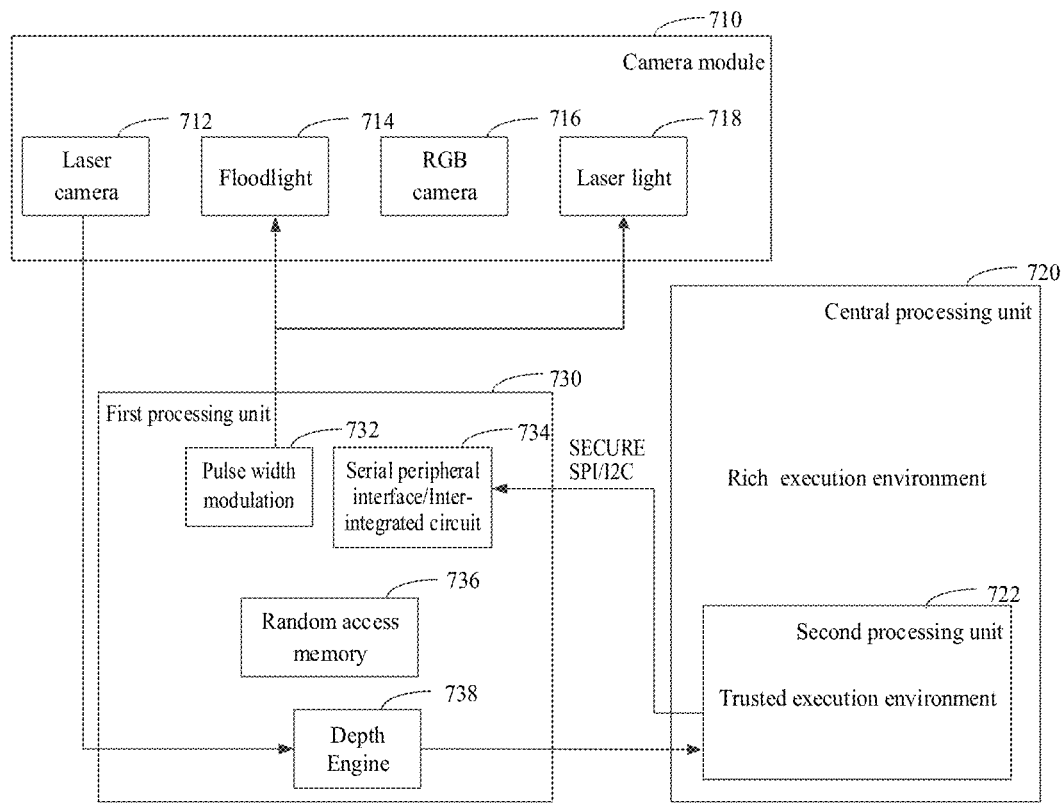
FIG. 7 is a diagram of a hardware structure for implementing a method for image processing according to an embodiment of the disclosure.

FIG. 7 is a diagram of a hardware structure for implementing a method for image processing according to an embodiment. As illustrated in FIG. 7, an electronic device may include a camera module 710, a CPU 720 and a first processing unit 730. The camera module 710 may include a laser camera 712, a floodlight 714, a Red/Green/Blue (RGB) camera 716 and a laser light 718. The first processing unit 730 includes a Pulse Width Modulation (PWM) module 732, a Serial Peripheral Interface/Inter-Integrated Circuit (SPI/I2C) module 734, a Random Access Memory (RAM) module 736 and a depth engine module 738. Herein, a second processing unit 722 may be a CPU core in a TEE, and the first processing unit 730 may be an MCU. It can be understood that the CPU 720 may be in a multi-core running mode, and the CPU core in the CPU 720 may run in an TEE or an REE. Both of the TEE and the REE are running modes of an Advanced Reduced Instruction Set Computer (RISC) Machine (ARM) module. Generally, operations with relatively high security in the electronic device are required to be executed in the TEE, and other operations may be executed in the REE. In the embodiment of the disclosure, when the CPU 720 receives a face verification instruction initiated by a target application program, the CPU core, i.e., the second processing unit 722, running in the TEE may send the face verification instruction to the SPI/I2C module 734 in the MCU 730 through a SECURE SPI/I2C. The first processing unit 730, after receiving the face verification instruction, emits a pulse wave through the PWM module 732 to control the floodlight 714 in the camera module 710 to be turned on to acquire an infrared image and control the laser light 718 in the camera module 710 to be turned on to acquire a speckle image. The camera module 710 may transmit the acquired infrared image and speckle image to the depth engine module 738 in the first processing unit 730, and the depth engine module 738 may calculate an infrared parallax image according to the infrared image, calculate a depth image according to the speckle image and obtain a depth parallax image according to the depth image. The infrared parallax image and the depth parallax image are sent to the second processing unit 722 running in the TEE. The second processing unit 722 may perform correction according to the infrared parallax image to obtain a target infrared image and perform correction according to the depth parallax image to obtain a target depth image. Then, face detection is performed according to the target infrared image to detect whether a target face region exists in the target infrared image and whether the detected target face region matches a preset face region. Responsive to that face matching succeeds, liveness detection is performed according to the target depth image to detect whether the target face region is a live face. A final face verification result is obtained according to a liveness detection result. Responsive to that liveness detection succeeds, a result indicating that face verification succeeds is obtained; and responsive to that liveness detection fails, a result indicating that face verification fails is obtained. It can be understood that after face matching fails, a result indicating that face verification fails is obtained, and liveness detection processing is not performed. The second processing unit 722, after obtaining the face verification result, may send the face verification result to the target application program.

Figure 8:
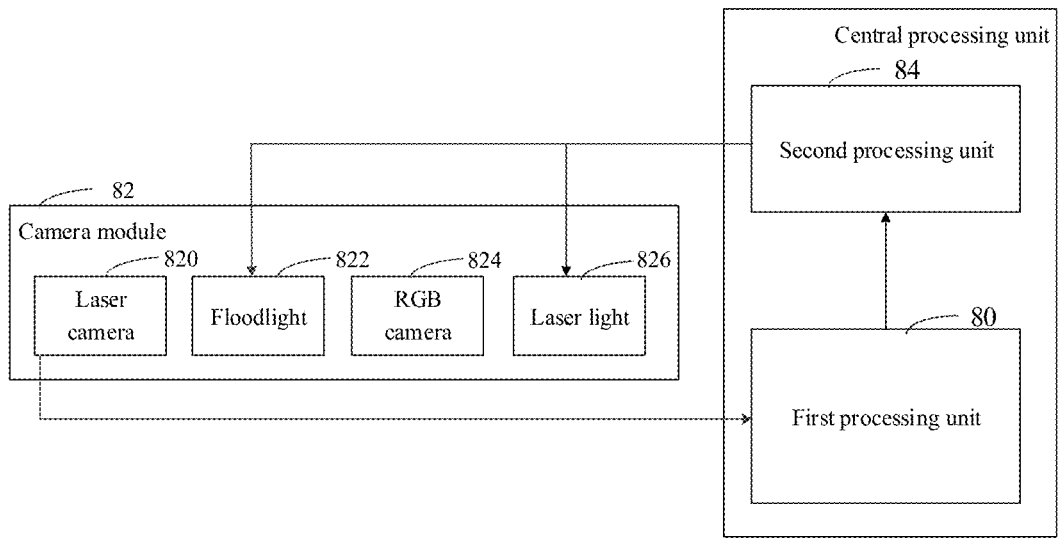
FIG. 8 is a diagram of a hardware structure for implementing a method for image processing according to another embodiment of the disclosure.

FIG. 8 is a diagram of a hardware structure for implementing a method for image processing according to another embodiment. As illustrated in FIG. 8, the hardware structure includes a first processing unit 80, a camera module 82 and a second processing unit 84. The camera module 82 includes a laser camera 820, a floodlight 822, an RGB camera 824 and a laser light 826. Herein, a CPU may include a CPU core in a TEE and a CPU core in an REE, the first processing unit 80 is a DSP module developed in the CPU, and the second processing unit 84 is the CPU core in the TEE. The second processing unit 84 is connected with the first processing unit 80 through a secure buffer, so that security in an image transmission process may be ensured. Generally, when the CPU executes an operation with relatively high security, the CPU core is required to be switched to the TEE for execution, and an operation with relatively low security may be executed in the REE. In the embodiment of the disclosure, a face verification instruction sent by an upper-layer application may be received through the second processing unit 84, and then a pulse wave is emitted through a PWM module to control the floodlight 822 in the camera module 82 to be turned on to acquire an infrared image and control the laser light 826 in the camera module 82 to be turned on to acquire a speckle image. The camera module 82 may transmit the acquired infrared image and speckle image to the first processing unit 80, and the first processing unit 80 may calculate a depth image according to the speckle image, calculate a depth parallax image according to the depth image and obtain an infrared parallax image according to the infrared image. Then, the infrared parallax image and the depth parallax image are sent to the second processing unit 84. The second processing unit 84 may perform correction according to the infrared parallax image to obtain a target infrared image and perform correction according to the depth parallax image to obtain a target depth image. The second processing unit 84 may perform face matching according to the target infrared image to detect whether a target face region exists in the target infrared image and whether the detected target face region matches a preset face region and, responsive to that face matching succeeds, perform liveness detection according to the target depth image to determine whether the target face region is a live face. The second processing unit 84, after performing face matching and liveness detection processing, sends a face verification result to the target application program, and the target application program executes application operations such as unlocking, payment and the like according to a detection result.

Figure 9:
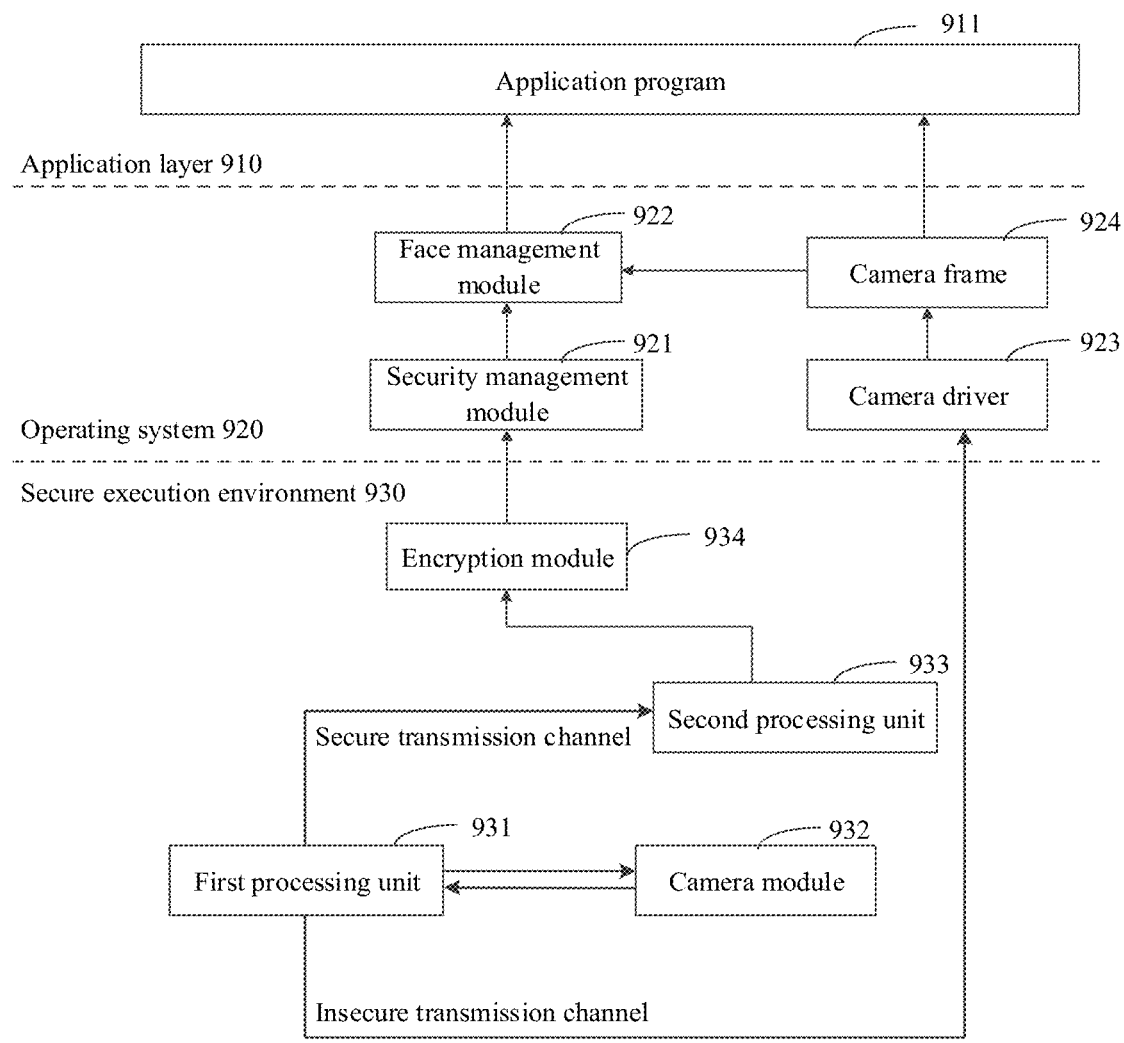
FIG. 9 is a schematic diagram of a software architecture for implementing a method for image processing according to an embodiment the disclosure.

FIG. 9 is a schematic diagram of a software architecture for implementing a method for image processing according to an embodiment. As illustrated in FIG. 9, the software architecture includes an application layer 910, an operating system 920 and a secure execution environment 930. Herein, modules running in the secure execution environment 930 include a first processing unit 931, a camera module 932, a second processing unit 933, an encryption module 934 and the like. The operating system 930 includes a security management module 921, a face management module 922, a camera driver 923 and a camera frame 924. The application layer 910 includes an application program 911. The application program 911 may initiate an image acquisition instruction and send the image acquisition instruction to the first processing unit 931 for processing. For example, when a face is acquired for operations of payment, unlocking, retouching, Augmented Reality (AR) and the like, the application program may initiate the image acquisition instruction of acquiring a face image. It can be understood that the image acquisition instruction initiated by the application program 911 may be sent to the second processing unit 933 at first and then sent to the first processing unit 931 by the second processing unit 933.

The first processing unit 931, after receiving the image acquisition instruction and it is determined that the image acquisition instruction is a face verification instruction for face verification, may control the camera module 932 according to the face verification instruction to acquire an infrared image and a speckle image, and the infrared image and speckle image acquired by the camera module 932 are transmitted to the first processing unit 931. The first processing unit 931 calculates a depth image including depth information according to the speckle image, calculates a depth parallax image according to the depth image and calculates an infrared parallax image according to the infrared image. The depth parallax image and the infrared parallax image are sent to the second processing unit 933 through a secure transmission channel. The second processing unit 933 may perform correction according to the infrared parallax image to obtain a target infrared image and perform correction according to the depth parallax image to obtain a target depth image. Then, face matching is performed according to the target infrared image to detect whether a target face region exists in the target infrared image and whether the detected target face region matches a preset face region. Responsive to that face matching succeeds, liveness detection is performed according to the target infrared image and the target depth image to determine whether the target face region is a live face. A face verification result obtained by the second processing unit 933 may be sent to the encryption module 934, and after being encrypted by the encryption module 934, the encrypted face verification result is sent to the security management module 921. Generally, different application programs 911 may have corresponding security management modules 921. The security management module 921 may perform decryption processing on the encrypted face verification result and send the face verification result which has been subjected to decryption processing to the corresponding face management module 922. The face management module 922 may send the face verification result to the upper-layer application program 911, and the application program 911 executes a corresponding operation according to the face verification result.

When an instruction received by the first processing unit 931 is not a face verification instruction, the first processing unit 931 may control the camera module 932 to acquire a speckle image, calculate a depth image according to the speckle image and obtain a depth parallax image according to the depth image. The first processing unit 931 may send the depth parallax image to the camera driver 923 through an insecure transmission channel, then the camera driver 923 performs correction processing according to the depth parallax image to obtain a target depth image and sends the target depth image to the camera frame 924, and the camera frame 924 sends the target depth image to the face management module 922 or the disclosure program 911.

FIG. 10 is a structure diagram of a device for image processing according to an embodiment. As illustrated in FIG. 10, a device 1000 for image processing includes a face detection module 1002, a face matching module 1004, a liveness detection module 1006 and a face verification module 1008.

The face detection module 1002 is configured to acquire a target infrared image and a target depth image and perform face detection according to the target infrared image to determine a target face region, here, the target depth image is used to represent depth information corresponding to the target infrared image.

The face matching module 1004 is configured to acquire a target face attribute parameter corresponding to the target face region and perform face matching processing on the target face region according to the target face attribute parameter.

The liveness detection module 1006 is configured to, responsive to that face matching succeeds, perform liveness detection processing on the target face region according to the target depth image to obtain a liveness detection result.

The face verification module 1008 is configured to obtain a face verification result according to the liveness detection result.

According to the device for image processing in the embodiment, the target infrared image and the target depth image may be acquired, and face detection may be performed according to the target infrared image to obtain the target face region. Then, the target face attribute parameter corresponding to the target face region is acquired, and face matching processing is performed on the target face region according to the target face attribute parameter. After face matching succeeds, liveness detection is performed according to the target depth image, and the final face verification result is obtained according to the liveness detection result. In such a manner, in a face verification process, face matching may be performed according to the infrared image and liveness detection may be performed according to the depth image, so that face verification accuracy is improved.

In an embodiment, the face detection module 1002 is further configured to, responsive to that a face verification instruction has been detected by a first processing unit, control a camera module to acquire an infrared image and a depth image, here, a time interval between a first moment at which the infrared image is acquired and a second moment at which the depth image is acquired is less than a first threshold. The face detection module 1002 is further configured to acquire the target infrared image according to the infrared image and acquire the target depth image according to the depth image.

In an embodiment, the face detection module 1002 is further configured to control the first processing unit to calculate an infrared parallax image according to the infrared image and calculate a depth parallax image according to the depth image, control the first processing unit to send the infrared parallax image and the depth parallax image to a second processing unit, and control the second processing unit to perform correction according to the infrared parallax image to obtain the target infrared image and perform correction according to the depth parallax image to obtain the target depth image.

In an embodiment, the face detection module 1002 is further configured to detect a face region in the target infrared image and, when two or more face regions exist in the target infrared image, determine a face region with a largest region area as the target face region.

In an embodiment, the liveness detection module 1006 is further configured to extract a target face depth region corresponding to the target face region from the target depth image, acquire a target liveness attribute parameter according to the target face depth region and perform liveness detection processing according to the target liveness attribute parameter.

In an embodiment, the liveness detection module 1006 is further configured to extract a target face depth region corresponding to the target face region from the target depth image and acquire a first target liveness attribute parameter according to the target face depth region; acquire a speckle image, here, the speckle image is an image which is acquired by a laser camera and which is formed by irradiation of an object with a laser speckle and the target depth image is calculated according to the speckle image; extract a target face speckle region corresponding to the target face region from the speckle image and acquire a second target liveness attribute parameter according to the target face speckle region; and perform liveness detection processing according to the first target liveness attribute parameter and the second target liveness attribute parameter.

In an embodiment, the face verification module 1008 is further configured to, responsive to that liveness detection succeeds, obtain a result indicating that face verification succeeds; responsive to that liveness detection fails, obtain a result indicating that face verification fails; responsive to that face matching fails, obtain a result indicating that face verification fails.

Division of each module in the device for image processing is only adopted for exemplary description and, in another embodiment, the device for image processing may be divided into different modules according to a requirement to realize part or all of functions of the device for image processing.

Additional Embodiments

An embodiment of the disclosure also provides a computer-readable storage medium. One or more non-transitory computer-readable storage media include computer-executable instructions that, when executed by one or more processors, cause the processors to perform the method for image processing in the abovementioned embodiments.

A computer program product including an instruction that, when run on a computer, causes the computer to perform the method for image processing provided in the abovementioned embodiments.

Any citation of a memory, storage, database or another medium used in the disclosure may include nonvolatile and/or nonvolatile memories. A proper nonvolatile memory may include a Read-Only Memory (ROM), a Programmable ROM (PROM), an Electrically Programmable ROM (EPROM), an Electrically Erasable Programmable ROM (EEPROM) or a flash memory. The volatile memory may include a RAM, and is used as an external high-speed buffer memory. Exemplarily but unlimitedly, the RAM may be obtained in various forms, for example, a Static RAM (SRAM), a Dynamic RAM (DRAM), a Synchronous DRAM (SDRAM), a Double Data Rate SDRAM (DDRS-DRAM), an Enhanced SDRAM (ESDRAM), a Synchlink DRAM (SLDRAM), a Rambus Direct RAM (RDRAM), a Direct RDRAM (DRDRAM) and a Rambus Dynamic RAM (RDRAM).

The embodiments of the present disclosure provide a method and device for image processing, a computer-readable storage medium and an electronic device, which may improve accuracy of the image processing.

At least some embodiments of the present disclosure provide a method for image processing, comprising:

acquiring a target infrared image and a target depth image, and performing face detection according to the target infrared image to determine a target face region, wherein the target depth image is used to represent depth information corresponding to the target infrared image;

acquiring a target face attribute parameter corresponding to the target face region, and performing face matching processing on the target face region according to the target face attribute parameter;

responsive to that face matching succeeds, performing liveness detection processing on the target face region according to the target depth image to obtain a liveness detection result; and obtaining a face verification result according to the liveness detection result.

According to at least some embodiments, wherein the target face attribute parameter comprises at least one of: a face deflection angle, a face brightness parameter, a parameter about facial features, a skin type parameter, or a geometric feature parameter.

According to at least some embodiments, wherein acquiring the target infrared image and the target depth image comprises:

responsive to that a face verification instruction has been detected by a first processing unit, controlling a camera module to acquire an infrared image and a depth image, wherein a time interval between a first moment at which the infrared image is acquired and a second moment at which the depth image is acquired is less than a first threshold; and acquiring the target infrared image according to the infrared image, and acquiring the target depth image according to the depth image.

According to at least some embodiments, wherein acquiring the target infrared image according to the infrared image and acquiring the target depth image according to the depth image comprises:

calculating, by the first processing unit, an infrared parallax image according to the infrared image and calculating a depth parallax image according to the depth image;

sending, by the first processing unit, the infrared parallax image and the depth parallax image to a second processing unit; and performing, by the second processing unit, correction according to the infrared parallax image to obtain the target infrared image and performing correction according to the depth parallax image to obtain the target depth image.

According to at least some embodiments, wherein performing face detection according to the target infrared image to determine the target face region comprises:

detecting a face region in the target infrared image; and when two or more face regions exist in the target infrared image, determining a face region with a largest region area as the target face region.

According to at least some embodiments, wherein performing liveness detection processing on the target face region according to the target depth image comprises:

extracting a target face depth region corresponding to the target face region from the target depth image, and acquiring a target liveness attribute parameter according to the target face depth region; and performing liveness detection processing according to the target liveness attribute parameter.

According to at least some embodiments, wherein the target liveness attribute parameter comprises at least one of: face depth information, a skin type feature, a texture direction, a texture density, or a texture width.

According to at least some embodiments, wherein performing liveness detection processing on the target face region according to the target depth image comprises:

extracting the target face depth region corresponding to the target face region from the target depth image, and acquiring a first target liveness attribute parameter according to the target face depth region;

acquiring a speckle image, the speckle image being an image which is acquired by a laser camera and which is formed by irradiation of an object with a laser speckle and the target depth image being calculated according to the speckle image;

extracting a target face speckle region corresponding to the target face region from the speckle image, and acquiring a second target liveness attribute parameter according to the target face speckle region; and performing liveness detection processing according to the first target liveness attribute parameter and the second target liveness attribute parameter.

According to at least some embodiments, wherein obtaining the face verification result according to the liveness detection result comprises:

responsive to that liveness detection succeeds, obtaining a result indicating that face verification succeeds, and responsive to that liveness detection fails, obtaining a result indicating that face verification fails; and the method further comprises:

responsive to that liveness matching fails, obtaining a result indicating that face verification fails.

At least some embodiments of the present disclosure provide a device for image processing, comprising:

a face detection module, configured to acquire a target infrared image and a target depth image and perform face detection according to the target infrared image to determine a target face region, wherein the target depth image is used to represent depth information corresponding to the target infrared image;

a face matching module, configured to acquire a target face attribute parameter corresponding to the target face region and perform face matching processing on the target face region according to the target face attribute parameter;

a liveness detection module, configured to, responsive to that face matching succeeds, perform liveness detection processing on the target face region according to the target depth image to obtain a liveness detection result; and a face verification module, configured to obtain a face verification result according to the liveness detection result.

According to at least some embodiments, wherein the target face attribute parameter comprises at least one of: a face deflection angle, a face brightness parameter, a parameter about facial features, a skin type parameter, or a geometric feature parameter.

According to at least some embodiments, wherein the face detection module is further configured to, responsive to that a face verification instruction has been detected by a first processing unit, control a camera module to acquire an infrared image and a depth image, wherein a time interval between a first moment at which the infrared image is acquired and a second moment at which the depth image is acquired is less than a first threshold; and the face detection module is further configured to acquire the target infrared image according to the infrared image and acquire the target depth image according to the depth image.

According to at least some embodiments, wherein the face detection module is further configured to control the first processing unit to calculate an infrared parallax image according to the infrared image and calculate a depth parallax image according to the depth image, control the first processing unit to send the infrared parallax image and the depth parallax image to a second processing unit, and control the second processing unit to perform correction according to the infrared parallax image to obtain the target infrared image and perform correction according to the depth parallax image to obtain the target depth image.

According to at least some embodiments, wherein the face detection module is further configured to detect a face region in the target infrared image and, when two or more face regions exist in the target infrared image, determine a face region with a largest region area as the target face region.

According to at least some embodiments, wherein the liveness detection module is further configured to extract a target face depth region corresponding to the target face region from the target depth image, acquire a target liveness attribute parameter according to the target face depth region and perform liveness detection processing according to the target liveness attribute parameter.

According to at least some embodiments, wherein the target liveness attribute parameter comprises at least one of: face depth information, a skin type feature, a texture direction, a texture density, or a texture width.

According to at least some embodiments, wherein the liveness detection module is further configured to extract a target face depth region corresponding to the target face region from the target depth image and acquire a first target liveness attribute parameter according to the target face depth region; acquire a speckle image, the speckle image being an image which is acquired by a laser camera and which is formed by irradiation of an object with a laser speckle and the target depth image being calculated according to the speckle image; extract a target face speckle region corresponding to the target face region from the speckle image and acquire a second target liveness attribute parameter according to the target face speckle region; and perform liveness detection processing according to the first target liveness attribute parameter and the second target liveness attribute parameter.

According to at least some embodiments, wherein the face verification module is further configured to, responsive to that liveness detection succeeds, obtain a result indicating that face verification succeeds; responsive to that liveness detection fails, obtain a result indicating that face verification fails, and responsive to that face matching fails, obtain a result indicating that face verification fails.

At least some embodiments of the present disclosure provide a computer-readable storage medium having stored thereon a computer program that, when executed by a processor, to implement the method for image processing in the above-mentioned embodiments.

At least some embodiments of the present disclosure a method for image processing, the method being applied to an electronic device comprising a first processor, the method comprising:

acquiring, by the first processor, a target infrared image and a target depth image, and performing face detection according to the target infrared image to determine a target face region, wherein the target depth image is used to represent depth information corresponding to the target infrared image;

acquiring, by the first processor, a target face attribute parameter corresponding to the target face region, and performing face matching processing on the target face region according to the target face attribute parameter;

responsive to that face matching succeeds, performing, by the first processor, liveness detection processing on the target face region according to the target depth image to obtain a liveness detection result; and obtaining, by the first processor, a face verification result according to the liveness detection result.

According to at least some embodiments, wherein the target face attribute parameter comprises at least one of: a face deflection angle, a face brightness parameter, a parameter about facial features, a skin type parameter, or a geometric feature parameter.

According to at least some embodiments, wherein the electronic device further comprises a second processor and a camera module; and acquiring the target infrared image and the target depth image comprises:

responsive to that a face verification instruction has been detected by the second processor, controlling, by the second processor, the camera module to acquire an infrared image and a depth image, wherein a time interval between a first moment at which the infrared image is acquired and a second moment at which the depth image is acquired is less than a first threshold; and receiving the infrared image and the depth image from the camera module; and acquiring, by the first processor, the target infrared image according to the infrared image, and acquiring the target depth image according to the depth image.

According to at least some embodiments, wherein acquiring the target infrared image according to the infrared image and acquiring the target depth image according to the depth image comprises:

calculating, by the second processor, an infrared parallax image according to the infrared image and calculating a depth parallax image according to the depth image;

sending, by the second processor, the infrared parallax image and the depth parallax image to the first processor; and performing, by the first processor, correction according to the infrared parallax image to obtain the target infrared image and performing correction according to the depth parallax image to obtain the target depth image.

According to at least some embodiments, wherein performing face detection according to the target infrared image to determine the target face region comprises:

detecting, by the first processor, a face region in the target infrared image; and when two or more face regions exist in the target infrared image, determining, by the first processor, a face region with a largest region area as the target face region.

According to at least some embodiments, wherein performing liveness detection processing on the target face region according to the target depth image comprises:

extracting, by the first processor, a target face depth region corresponding to the target face region from the target depth image, and acquiring a target liveness attribute parameter according to the target face depth region; and performing, by the first processor, liveness detection processing according to the target liveness attribute parameter.

According to at least some embodiments, wherein the target liveness attribute parameter comprises at least one of: face depth information, a skin type feature, a texture direction, a texture density, or a texture width.

According to at least some embodiments, wherein performing liveness detection processing on the target face region according to the target depth image comprises:

extracting, by the first processor, the target face depth region corresponding to the target face region from the target depth image, and acquiring a first target liveness attribute parameter according to the target face depth region;

acquiring, by the first processor, a speckle image, the speckle image being an image which is acquired by a laser camera and which is formed by irradiation of an object with a laser speckle and the target depth image being calculated according to the speckle image;

extracting, by the first processor, a target face speckle region corresponding to the target face region from the speckle image, and acquiring a second target liveness attribute parameter according to the target face speckle region; and performing, by the first processor, liveness detection processing according to the first target liveness attribute parameter and the second target liveness attribute parameter.

According to at least some embodiments, wherein obtaining the face verification result according to the liveness detection result comprises:

responsive to that liveness detection succeeds, obtaining, by the first processor, a result indicating that face verification succeeds, and responsive to that liveness detection fails, obtaining, by the first processor, a result indicating that face verification fails; and the method further comprises:

responsive to that liveness matching fails, obtaining, by the first processor, a result indicating that face verification fails.

At least some embodiments of the present disclosure provide an electronic device, comprising:

a first processor; and a memory storing instructions that, when executed by the first processor, cause the first processor to:

acquire a target infrared image and a target depth image and perform face detection according to the target infrared image to determine a target face region, wherein the target depth image is used to represent depth information corresponding to the target infrared image;

acquire a target face attribute parameter corresponding to the target face region and perform face matching processing on the target face region according to the target face attribute parameter;

responsive to that face matching succeeds, perform liveness detection processing on the target face region according to the target depth image to obtain a liveness detection result; and obtain a face verification result according to the liveness detection result.

According to at least some embodiments, wherein the target face attribute parameter comprises at least one of: a face deflection angle, a face brightness parameter, a parameter about facial features, a skin type parameter, or a geometric feature parameter.

According to at least some embodiments, wherein the electronic device further comprises a second processor and a camera module, and the second processor is configured to, responsive to that a face verification instruction has been detected by the second processor, control the camera module to acquire an infrared image and a depth image, wherein a time interval between a first moment at which the infrared image is acquired and a second moment at which the depth image is acquired is less than a first threshold; and receive the infrared image and the depth image from the camera module;

the first processor is further configured to acquire the target infrared image according to the infrared image and acquire the target depth image according to the depth image.

According to at least some embodiments, wherein the second processor is further configured to calculate an infrared parallax image according to the infrared image and calculate a depth parallax image according to the depth image, and send the infrared parallax image and the depth parallax image to the first processor; and the first processor is further configured to perform correction according to the infrared parallax image to obtain the target infrared image and perform correction according to the depth parallax image to obtain the target depth image.

According to at least some embodiments, wherein the first processor is further configured to detect a face region in the target infrared image and, when two or more face regions exist in the target infrared image, determine a face region with a largest region area as the target face region.

According to at least some embodiments, wherein the first processor is further configured to extract a target face depth region corresponding to the target face region from the target depth image, acquire a target liveness attribute parameter according to the target face depth region and perform liveness detection processing according to the target liveness attribute parameter.

According to at least some embodiments, wherein the target liveness attribute parameter comprises at least one of: face depth information, a skin type feature, a texture direction, a texture density, or a texture width.

According to at least some embodiments, wherein the first processor is further configured to extract a target face depth region corresponding to the target face region from the target depth image and acquire a first target liveness attribute parameter according to the target face depth region; acquire a speckle image, the speckle image being an image which is acquired by a laser camera and which is formed by irradiation of an object with a laser speckle and the target depth image being calculated according to the speckle image; extract a target face speckle region corresponding to the target face region from the speckle image and acquire a second target liveness attribute parameter according to the target face speckle region; and perform liveness detection processing according to the first target liveness attribute parameter and the second target liveness attribute parameter.

According to at least some embodiments, wherein the first processor is further configured to, responsive to that liveness detection succeeds, obtain a result indicating that face verification succeeds; responsive to that liveness detection fails, obtain a result indicating that face verification fails, and responsive to that face matching fails, obtain a result indicating that face verification fails.

According to at least some embodiments, wherein the first processor comprises a central processing unit (CPU) core and the second processor comprises a microcontroller unit (MCU); or the first processor comprises a central processing unit (CPU) core and the second processor comprises a Digital Signal Processor (DSP) module in the CPU.

At least some embodiments of the present disclosure provide a computer-readable storage medium having stored thereon a computer program that, when executed by one or more processors, cause the one or more processors to:

acquire a target infrared image and a target depth image and perform face detection according to the target infrared image to determine a target face region, wherein the target depth image is used to represent depth information corresponding to the target infrared image;

acquire a target face attribute parameter corresponding to the target face region and perform face matching processing on the target face region according to the target face attribute parameter;

responsive to that face matching succeeds, perform liveness detection processing on the target face region according to the target depth image to obtain a liveness detection result; and obtain a face verification result according to the liveness detection result.

The abovementioned embodiments only express some implementation modes of the disclosure and are specifically described in detail and not thus understood as limits to the patent scope of the disclosure. It is to be noted that those of ordinary skill in the art may further make a plurality of transformations and improvements without departing from the concept of the disclosure and all of these fall within the scope of protection of the disclosure. Therefore, the scope of protection of the disclosure should be subject to the appended claims.

The invention claimed is:

1. A method for image processing, the method being applied to an electronic device comprising a first processor, the method comprising:

acquiring, by the first processor, a target infrared image and a target depth image, and performing face detection according to the target infrared image to determine a target face region, wherein the target depth image is used to represent depth information corresponding to the target infrared image;

acquiring, by the first processor, a target face attribute parameter corresponding to the target face region, and performing face matching processing on the target face region according to the target face attribute parameter;

responsive to that face matching succeeds, performing, by the first processor, liveness detection processing on the target face region according to the target depth image to obtain a liveness detection result; and obtaining, by the first processor, a face verification result according to the liveness detection result;

wherein the electronic device further comprises a second processor and a camera module: and
acquiring the target infrared image and the target depth image comprises:
responsive to that a face verification instruction has been detected by the second processor, controlling, by the second processor, the camera module to acquire an infrared image and a depth image and receiving the infrared image and the depth image from the camera module, wherein a time interval between a first moment at winch the infrared image is acquired and a second moment at which the depth image is acquired is less than a first threshold; and
acquiring, by the first processor, the target infrared image according to the infrared image, and acquiring the target depth image according to the depth image.

2. The method of claim 1, wherein the target face attribute parameter comprises at least one of: a face deflection angle, a face brightness parameter, a parameter about facial features, a skin type parameter, or a geometric feature parameter.

3. The method of claim 1, wherein acquiring the target infrared image according to the infrared image and acquiring the target depth image according to the depth image comprises:
calculating, by the second processor, an infrared parallax image according to the infrared image and calculating a depth parallax image according to the depth image;
sending, by the second processor, the infrared parallax image and the depth parallax image to the first processor; and
performing, by the first processor, correction according to the infrared parallax image to obtain the target infrared image and performing correction according to the depth parallax image to obtain the target depth image.

4. The method of claim 1, wherein performing face detection according to the target infrared image to determine the target face region comprises:
detecting, by the first processor, a face region in the target infrared image; and
when two or more face regions exist in the target infrared image, determining, by the first processor, a face region with a largest region area as the target face region.

5. The method of claim 1, wherein performing liveness detection processing on the target face region according to the target depth image comprises:
extracting, by the first processor, a target face depth region corresponding to the target face region from the target depth image, and acquiring a target liveness attribute parameter according to the target face depth region; and
performing, by the first processor, liveness detection processing according to the target liveness attribute parameter.

6. The method of claim 1, wherein the target liveness attribute parameter comprises at least one of: face depth information, a skin type feature, a texture direction, a texture density, or a texture width.

7. The method of claim 1, wherein performing liveness detection processing on the target face region according to the target depth image comprises:
extracting, by the first processor, the target face depth region corresponding to the target face region from the target depth image, and acquiring a first target liveness attribute parameter according to the target face depth region;
acquiring, by the first processor, a speckle image, the speckle image being an image which is acquired by a laser camera and which is formed by irradiation of an object with a laser speckle and the target depth image being calculated according to the speckle image;
extracting, by the first processor, a target face speckle region corresponding to the, target face region from the speckle image, and acquiring a second target liveness attribute parameter according to the target face speckle region; and
performing, by the first processor, liveness detection processing according to the first target liveness attribute parameter and the second target liveness attribute parameter.

8. The method of claim 1, wherein obtaining the thee verification result according to the liveness detection result comprises:
responsive to that liveness detection succeeds, obtaining, by the first processor, a result indicating that face verification succeeds, and responsive to that liveness detection fails, obtaining, by the first processor, a result indicating that face verification fails; and
the method further comprises:
responsive to that li mess matching fails, obtaining, by the first processor, a result indicating that face verification fails.

9. An electronic device, comprising:
a first processor; and
a memory storing instructions that, when executed by the first processor, cause processor to:
acquire a target infrared image and a target depth image and perform face detection according to the target infrared image to determine a target face region, Wherein the target depth image is used to represent depth information corresponding to the target infrared image;
acquire a target face attribute parameter corresponding to the target face region and perform face matching processing on the target face region according to the target face attribute parameter;
responsive to that face snatching succeeds, perform liveness detection processing on the target region according to the target depth image to obtain liveness detection result; and
obtain a face verification result according to the liveness detection result;
wherein the electronic device further comprises a second processor and a camera module and
the second processor is configured to, responsive to that a face verification instruction has been detected by the second processor, control the camera module to acquire an infrared image and a depth image and receive the infrared image and the depth image from the camera module, wherein a time interval between a first moment at which the infrared image is acquired and a second moment at which the depth image is acquired is less than a first threshold; and
the first processor is further configured to acquire the target infrared image according to the infrared image and acquire the target depth image according to the depth image.

10. The electronic device of claim 9, wherein the target face attribute parameter comprises at least one of: a face deflection angle, a face brightness parameter, a parameter about facial features, a skin type parameter, or a geometric feature parameter.

11. The electronic device of claim 9, wherein the second processor is further configured to calculate an infrared parallax image according to the infrared image and calculate a depth parallax image according to the depth image, and send the infrared parallax image and the depth parallax image to the first processor; and the first processor is further configured to perform correction according to the infrared parallax image to obtain the target infrared image and perform correction according to the depth parallax image to obtain the target depth image.

12. The electronic device of claim 9, wherein the first processor is further configured to detect a face region in the target infrared image and, when two or more face regions exist in the target infrared image, determine a face region with a largest region area as the target face region.

13. The electronic device of claim 9, wherein the first processor is further configured to extract a target thee depth region corresponding to the target face region from the target depth image, acquire a target liveness attribute parameter according to the target face depth region and perform liveness detection processing according to the target liveness attribute parameter.

14. The electronic device of claim 9, wherein the target liveness attribute parameter comprises at least one of: face depth information, a skin type feature, a texture direction, a texture density, or a texture width.

15. The electronic device of claim 9, wherein the first processor is further configured to extract a target face depth region corresponding to the target face region from the target depth image and acquire a first target liveness attribute parameter according to the target face depth region; acquire a speckle image, the speckle image being an image which is acquired by a laser camera and which is formed by irradiation of an object with a laser speckle and the target depth image being calculated according to the speckle image; extract a target face speckle region corresponding to the target face region from the speckle image and acquire a second target liveness attribute parameter according to the target face speckle region; and perform liveness detection processing according to the first target liveness attribute parameter and the second target liveness attribute parameter.

16. The electronic device of claim 9, wherein the first processor is further configured to, responsive to that liveness detection succeeds, obtain a result indicating that face verification succeeds; responsive to that liveness detection fails, obtain a result indicating that face verification fails, and responsive to that face matching fails, obtain a result indicating that face verification fails.

17. The electronic device of claim 9, wherein the first processor comprises a central. processing unit (CPU) core and the second processor comprises a microcontroller unit (MCU);

or the first processor comprises a central processing unit (CPU) core and the second processor comprises a Digital Signal Processor (DSP) module in the CPU.

18. A non-transitory computer-readable storage medium having stored thereon a computer program that, when executed by one or more processors, cause the one or more processors to:

acquire a target infrared image and a target depth image and perform face detection according to the target infrared image to determine a target face region, wherein the target depth image is used to represent depth information corresponding to the target infrared image;

acquire a target face attribute parameter corresponding to the target face region and perform face matching processing on the target face region according to the target face attribute parameter;

responsive to that face matching succeeds, perform liveness detection processing on the target face region according to the target depth image to obtain a liveness detection result; and obtain a face verification result according to the liveness detection result;

wherein the operation of acquiring the target infrared image and the target depth image comprises:

responsive to that a face verification instruction has been detected by the second processor, controlling a camera module to acquire an infrared image and a depth image and receiving the infrared image and the depth image from the camera module, wherein a time interval between a first moment at which the infrared image is acquired and a second moment at which the depth image is acquired is less than a first threshold; and acquiring the target infrared image according to the infrared image, and acquiring the target depth image according to the depth image.

* * * * *